US012691409B2

(12) United States Patent
Thomas-Alyea et al.

(10) Patent No.: US 12,691,409 B2
(45) Date of Patent: Jul. 28, 2026

(54) COMPOSITE FOR ELECTROCHEMICAL GAS SEPARATION

(71) Applicant: VERDOX, INC., Woburn, MA (US)

(72) Inventors: Karen Thomas-Alyea, Arlington, MA (US); Sahag Voskian, Boston, MA (US); Cameron Rogers, Malden, MA (US); Alexander Reath, Melrose, MA (US)

(73) Assignee: Verdox, Inc., Woburn, MA (US)

( * ) Notice: Subject to any disclaimer, the term of this patent is extended or adjusted under 35 U.S.C. 154(b) by 556 days.

(21) Appl. No.: 18/035,968

(22) PCT Filed: Sep. 10, 2021

(86) PCT No.: PCT/US2021/049751

§ 371 (c)(1),
(2) Date: May 9, 2023

(87) PCT Pub. No.: WO2022/103477

PCT Pub. Date: May 19, 2022

(65) Prior Publication Data

US 2024/0017209 A1 Jan. 18, 2024

Related U.S. Application Data

(60) Provisional application No. 63/111,761, filed on Nov. 10, 2020.

(51) Int. Cl.

*C25B 9/00* (2021.01)
*B01D 53/32* (2006.01)

(Continued)

(52) U.S. Cl.

CPC ........... *B01D 53/326* (2013.01); *B01D 53/62* (2013.01); *B01D 53/965* (2013.01);

(Continued)

(58) Field of Classification Search

CPC .... B01D 53/326; B01D 53/62; B01D 53/965; B01D 2253/102; B01D 2253/25;

(Continued)

(56) References Cited

U.S. PATENT DOCUMENTS

| | | | | |
|---|---|---|---|---|
| 2009/0198117 A1* | 8/2009 | Cooper | A61B 5/6846 600/347 |
| 2017/0113182 A1* | 4/2017 | Voskian | B01D 53/326 |
| 2020/0109228 A1* | 4/2020 | Stewart | C08G 75/0204 |

OTHER PUBLICATIONS

Ho et al., "Silicon-Impregnated Carbon Nanotube Mat as a Lithium-Ion Cell Anode", Journal of Applied Electrochemistry, Dec. 26, 2017; 117 pages.

International Search Report for the corresponding International Application No. PCT/US2021/049751; Internmational Filing Date: Sep. 10, 2021; Date of Mailing: Jan. 6, 2022; 3 pages.

(Continued)

*Primary Examiner* — Zulmariam Mendez

(74) *Attorney, Agent, or Firm* — Stites & Harbison, PLLC

(57) ABSTRACT

A composite includes a nonwoven carbon nanotube mat and an electroactive species disposed on the nonwoven carbon nanotube mat, wherein the electroactive species is capable of bonding with a target gas when the electroactive species is in a reduced state and releasing the target gas when the electroactive species is in an oxidized state. Electrode assemblies, electro-chemical cells, and gas separation systems including the composite are also described herein.

24 Claims, 5 Drawing Sheets

(51) Int. Cl.
*B01D 53/62* (2006.01)
*B01D 53/96* (2006.01)
*C01B 32/168* (2017.01)

(52) U.S. Cl.
CPC ...... *C01B 32/168* (2017.08); *B01D 2253/102* (2013.01); *B01D 2253/25* (2013.01); *B01D 2253/304* (2013.01); *B01D 2253/311* (2013.01); *B01D 2257/504* (2013.01); *B01D 2258/0283* (2013.01); *C01B 2202/34* (2013.01); *C01B 2202/36* (2013.01)

(58) Field of Classification Search
CPC ........ B01D 2253/304; B01D 2253/311; B01D 2257/504; B01D 2258/0283; C01B 2202/34; C01B 2202/36; C01B 32/168
See application file for complete search history.

(56) References Cited

OTHER PUBLICATIONS

Jiang, D. et al. "Fabrication of Stretchable Copper Coated Carbon Nanotube Conductor for Non-Enzymatic Glucose Detection Electrode with Low Detection Limit and Selectivity", Polymers, vol. 10, No. 375, 2018; 14 pages.
Niu, Z. et al., "A "skeleton/skin" strategy for preparing ultrathin free-standing single-walled carbon nanotube/polyaniline fifilms for high performance supercapacitor electrodes", Energy Environ. Sci., vol. 5, 2012; pp. 8726-8733.
Voskian et al., "Faradaic electro-swing reactive adsorption for CO2 capture", Energy & Environmental Science, vol. 12, 2019; pp. 3530-3547.
Written Opinion for the corresponding International Application No. PCT/US2021/049751; Internmational Filing Date: Sep. 10, 2021; Date of Mailing: Jan. 6, 2022; 7 pages.

* cited by examiner

Fig. 1A
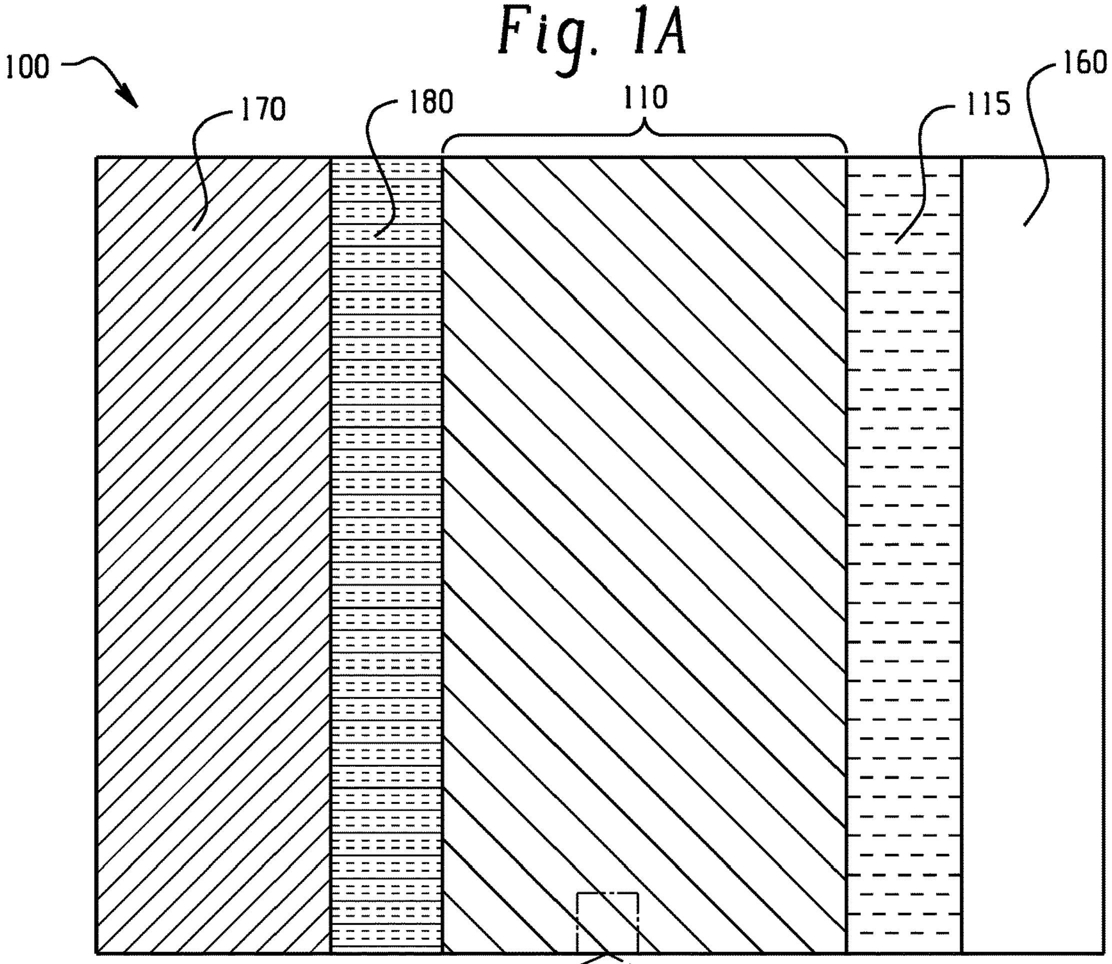
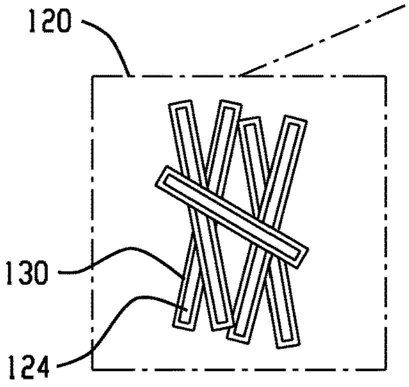
Fig. 1B
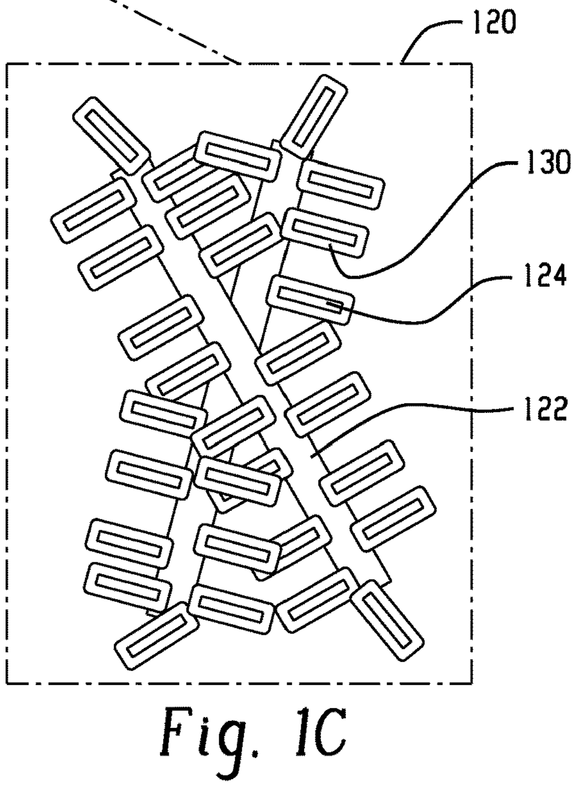
Fig. 1C

Fig. 8
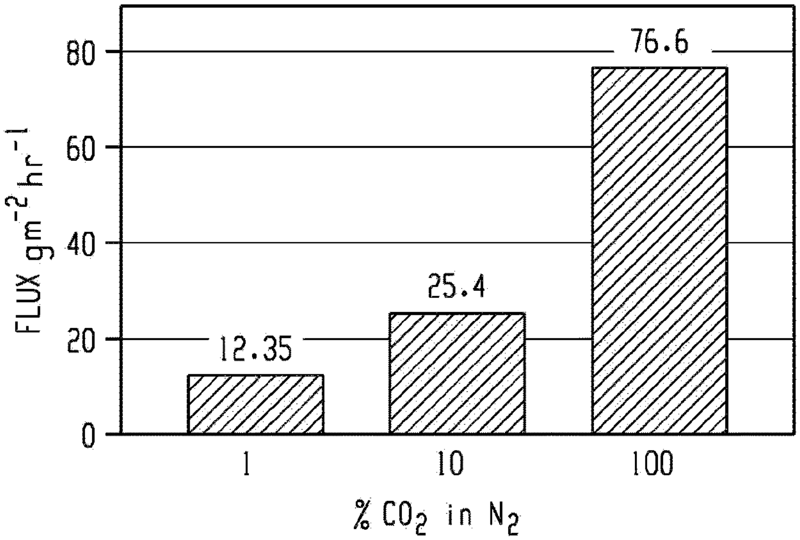
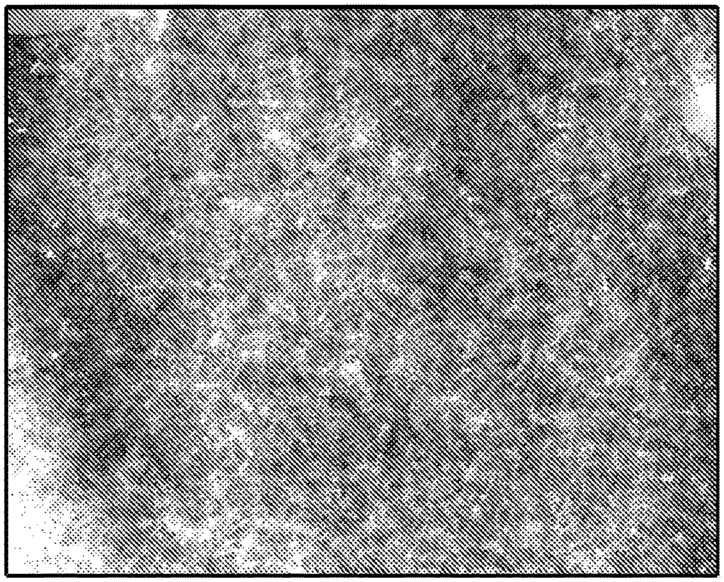
Fig. 9
Fig. 10
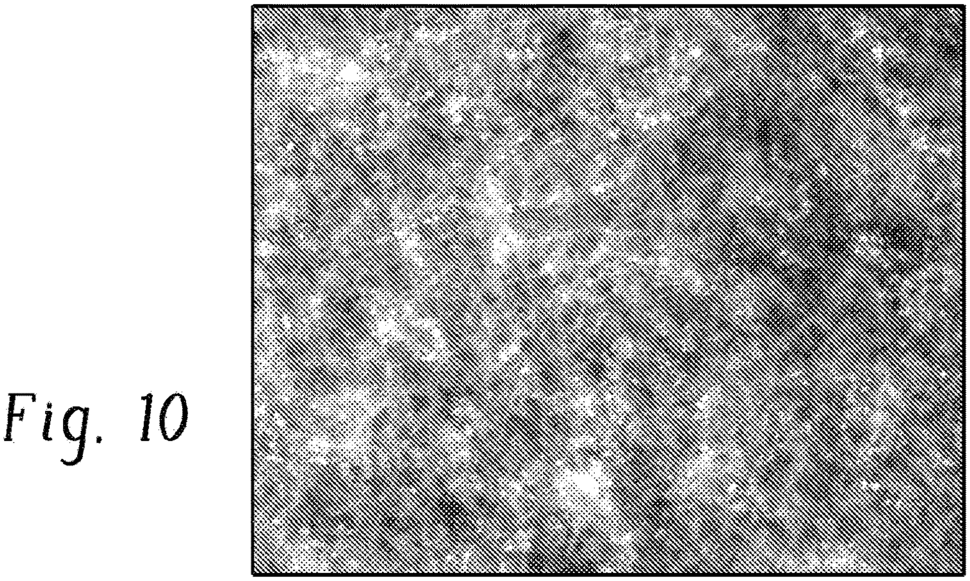

COMPOSITE FOR ELECTROCHEMICAL GAS SEPARATION

CROSS-REFERENCE TO RELATED APPLICATIONS

This application is a National Stage application of PCT/US2021/049751, filed Sep. 10, 2021, which claims priority to U.S. Provisional Application No. 63/111,761, filed Nov. 10, 2020, the contents of both of which are incorporated by reference herein in their entirety.

FEDERAL RESEARCH STATEMENT

This invention was made with government support under award number DE-SC0020915 awarded by the Office of Science SC-1, U.S. Department of Energy. The government has certain rights in the invention.

BACKGROUND

Removing target species from gas mixtures has been the subject of much research and development. For example, there have been efforts to mitigate global warming by curbing carbon dioxide emissions. To this end, a number of approaches have been explored, including conventional thermal methods, to capture carbon dioxide at different stages of its production. Other potential applications of target gas removal include removing target gases directly from air or ventilated air.

Electroswing adsorption is an alternative method of capturing a target gas from a gaseous mixture. Typically, the electrode in an electroswing adsorption cell includes an electrically conductive scaffold, such as carbon fiber paper, which serves several functions including providing a conduction path for electrons, a surface area for an active material to interface with the electrolyte, and mechanical support to maintain a porous structure.

There remains a continuing need for improved materials and methods for capturing a target species from a gas mixture. It would be particularly advantageous to provide a method for capturing a target gas using an electroswing adsorption cell with a thinner electrode.

SUMMARY

A composite comprises a nonwoven carbon nanotube mat comprising a plurality of entangled carbon nanotubes; and an electroactive species disposed on the nonwoven carbon nanotube mat, wherein the electroactive species is capable of bonding with a target gas when the electroactive species is in a reduced state and releasing the target gas when the electroactive species is in an oxidized state.

An electrode assembly comprises a porous separator; and the composite.

An electrochemical cell comprises the composite.

A gas separation system comprises a plurality of electrochemical cells in fluid communication with a gas inlet and a gas outlet.

A method of making the composite comprises contacting the nonwoven carbon nanotube mat with the electroactive species.

A method of making the composite comprises contacting a solution comprising a plurality of electroactive monomers, at least one initiator, and optionally, a crosslinker with the nonwoven carbon nanotube mat; and initiating polymerization in the presence of the nonwoven carbon nanotube mat.

The above described and other features are exemplified by the following figures and detailed description.

BRIEF DESCRIPTION OF THE DRAWINGS

The following figures are exemplary embodiments wherein the like elements are numbered alike.

FIG. 1A is a schematic illustration of an electrochemical cell.

FIG. 1B is a schematic illustration of an electrically conductive scaffold comprising a mat of carbon nanotubes coated with a polymer.

FIG. 1C is a schematic illustration of an electrically conductive scaffold comprising polymer-coated carbon nanotubes deposited on a carbon fiber paper.

FIG. 8 is a graph of flux (g $m^{-2}$ $hr^{-1}$) versus percent $CO_2$ in $N_2$ for the composition of Example 3.

FIG. 9 is a scanning electron micrograph of an electrically conductive scaffold comprising a mat of carbon nanotubes coated with a polymer as described in Example 1 at 10K magnification using a 10 kV acceleration voltage.

FIG. 10 is an electron micrograph of an electrically conductive scaffold comprising a mat of carbon nanotubes coated with a polymer as described in Example 1 at 25K magnification using a 10 kV acceleration voltage.

DETAILED DESCRIPTION

Figure 2:
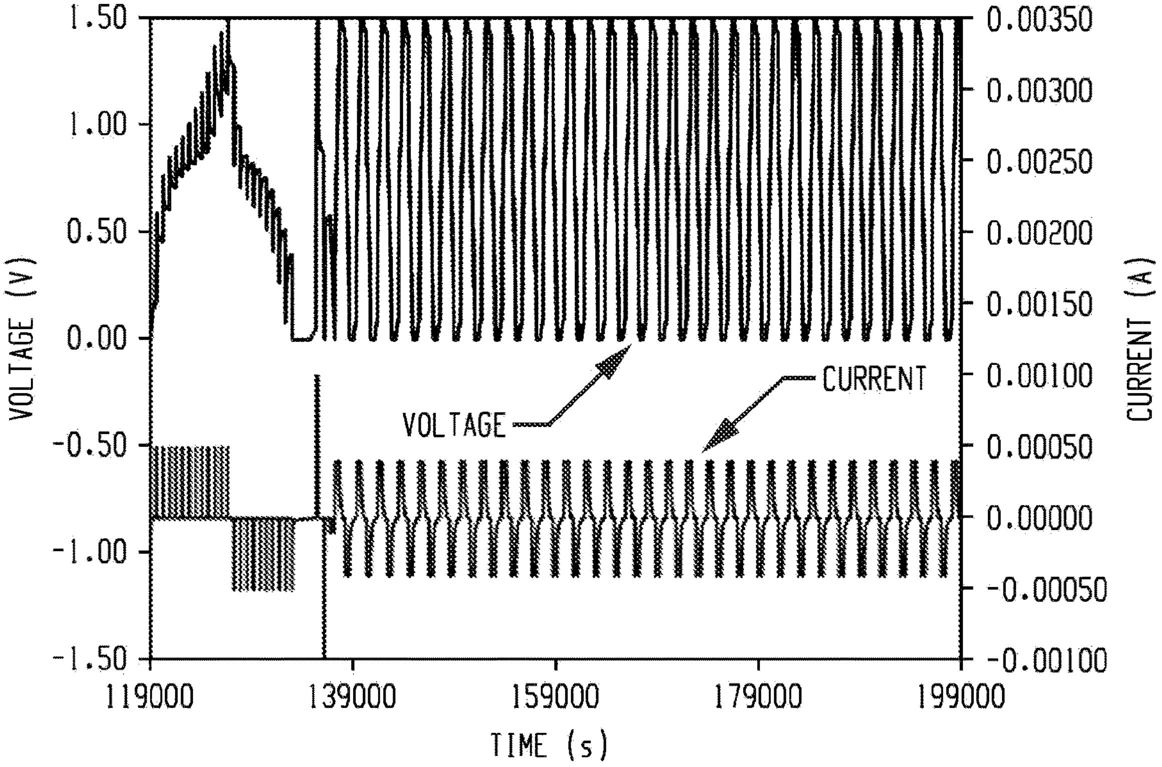
FIG. 2 is a graph of cell voltage (volts) and current (amperes) versus time (seconds) for the sealed cell of Example 1.

The present inventors have unexpectedly discovered that a composite comprising a nonwoven carbon nanotube mat and an electroactive species disposed on the nonwoven carbon nanotube mat can be particularly useful in electrode assemblies, electrochemical cells, and gas separation systems. More specifically, the composite described herein can be useful for separating a target gas (e.g., $CO_2$ or $SO_2$) from a gas mixture by an electrochemical process. Advantageously, the relatively thin carbon nanotube mat enables a higher capture rate than when using a thicker or less porous material. Additionally, coating the electroactive species on the carbon nanotube mat can provide improved cycle life. Thus, a significant improvement is provided by the composite of the present disclosure.

Accordingly, an aspect of the present disclosure is a composite. The composite comprises a nonwoven carbon nanotube mat and an electroactive species disposed on the nonwoven carbon nanotube mat.

The nonwoven carbon nanotube mat comprises a plurality of entangled carbon nanotubes. The carbon nanotubes can comprise single wall carbon nanotubes, multiwall carbon nanotubes, or a combination thereof. In an aspect, the carbon nanotubes are single wall carbon nanotubes. In an aspect, the carbon nanotubes are multiwall carbon nanotubes. The carbon nanotube mat is porous and can generally have any suitable porosity.

The carbon nanotubes can have an average diameter of 50 nanometers or less. Within this range, the carbon nanotubes can have an average diameter of 1 to 50 nanometers, or 1 to 40 nanometers, or 1 to 30 nanometers, or 1 to 20 nanometers.

The carbon nanotubes can have an average length of 500 nanometers to 2 millimeters, for example, 1 micrometer to 2 millimeters. Within this range, the carbon nanotubes can have an average length of at least 750 nanometers, or at least 1 micrometer, or at least 5 micrometers, or at least 10 micrometers, or at least 50 micrometers, or at least 100 micrometers, or at least 500 micrometers. Also within this range, the carbon nanotubes can have an average length of at most 1.5 millimeters, or at most 1 millimeter, or at most 750 micrometers, or at most 500 micrometers, or at most 250 micrometers, or at most 100 micrometers. Use of carbon nanotubes having a length of 2 micrometers (μm) to 1 mm, or 10 μm to 100 μm is disclosed The carbon nanotubes can have an aspect ratio of 20:1 to 109:1, or 20:1 to $10^6$:1, or 20:1 to 100,000:1, or 20:1 to 1,000:1. The aspect ratio can be a length:width, e.g.: an average length: an average width.

The physical characteristics of the carbon nanotubes, including average diameter, average length, and aspect ratio can be determined using appropriate imaging techniques, for example scanning electron microscopy (SEM) or transmission electron microscopy (TEM).

The carbon nanotubes can be in oxidized form, reduced form, or can be functionalized. Stated another way, the carbon nanotubes can include oxygen-containing groups, hydrogen, other functional groups (e.g., sulfonate, phosphonate, ammonium, carboxylate, or a combination thereof), or a combination thereof.

The carbon nanotube mat can account for 10 to 90 weight percent of the composite, based on the total weight of the composite. Within this range, the carbon nanotube mat can account for 25 to 90 weight percent, or 25 to 80 weight percent, or 30 to 75 weight percent, or 40 to 60 weight percent, each based on the total weight of the composite. In an aspect, the carbon nanotube mat can account for 10 to 50 percent of the volume of the composite, for example 10 to 40 volume percent, or 10 to 30 volume percent, or 10 to 25 volume percent, or 15 to 20 volume percent, based on the total volume of the composite.

The nonwoven carbon nanotube mat can have a tensile strength of at least 100 kilopascals (kPa). For example, the nonwoven carbon nanotube mat can have a tensile strength of at least 200 kPa, or at least 400 kPa, e.g., 100 kPa to 10000 kPa. Such tensile strength can be useful for facilitating roll-to-roll processing of the composite.

Exemplary carbon nanotube mats can include those available under the trade name MIRALON, commercially available from NanoComp Technologies, Inc.

In an aspect, a carbon nanotube mat can be prepared, for example, by forming a dispersion comprising a plurality of carbon nanotubes in a solvent. The carbon nanotubes can be as described above.

The composite comprises an electroactive species disposed on the nonwoven carbon nanotube mat. In an aspect, the electroactive species can be on a surface of the nonwoven carbon nanotube mat. In an aspect, the electroactive species can be on a surface of a carbon nanotube of the nonwoven carbon nanotube mat. The electroactive species can be disposed directly on the mat (i.e., wherein no intervening layer or material is present between the electroactive species and the carbon nanotube). In an aspect, one or more intervening layers can be disposed between the electroactive species and the surface of the carbon nanotube or the surface of the carbon nanotube mat.

The electroactive species can be referred to as being immobilized on the carbon nanotube mat such that the electroactive species is not capable of freely diffusing away from or dissociating from the carbon nanotube mat. The electroactive species can be immobilized on the carbon nanotube mat in a variety of ways. For example, the electroactive species can be immobilized on the carbon nanotube mat by being bound (e.g., via covalent bonds, ionic bonds, or intramolecular interaction such as electrostatic forces, van der Waals forces, hydrogen bonding, or a combination thereof) to the surface of the carbon nanotube mat. In an aspect, the electroactive species can be immobilized on the carbon nanotube mat by being adsorbed onto the carbon nanotube mat. In an aspect, the electroactive species can be immobilized on the carbon nanotube mat. Immobilizing the electroactive species can include, but is not limited to, grafting or polymerizing the electroactive species onto the carbon nanotube mat, e.g., grafted to a surface of a carbon nanotube of the carbon nanotube mat. "Grafting" as used herein refers to a chemical or electrochemical process producing a covalent bond between the electroactive species and the carbon nanotube mat. In an aspect, the electroactive species can be immobilized on the carbon nanotube mat by being included in a composition, e.g., a coating or a composite layer that is applied or deposited onto the carbon nanotube mat.

As used herein, an "electroactive species" refers to an agent (e.g., a chemical entity) which undergoes oxidation or reduction upon exposure to an electrical potential in an electrochemical cell. The electroactive species of the composite is capable of bonding with or binding to a target gas when the electroactive species is in a reduced state and releasing the target gas when the electroactive species is in an oxidized state. Stated another way, the electroactive species can be reduced to a corresponding reduced state, which binds to the target gas forming a complex or an adduct. Subsequent oxidation of the electroactive species can release the target gas. As a non-limiting example, if the electroactive species is benzoquinone, the neutral benzoquinone would be considered the oxidized state, the semiquinone (e.g., a product of the addition of one electron to neutral benzoquinone) would be considered one reduced state, and the benzoquinone dianion (the product of the addition of one electron to neutral benzoquinone) would be considered a second reduced state.

The electroactive species of the composite can be selected such that in at least one reduced state, the electroactive species can have a strong affinity for the target gas. In an aspect, in a reduced state, the electroactive species can have a binding constant with the target gas of at least $10^1$ liters/mole, ($M^{-1}$), or at least $10^2$ $M^{-1}$, or at least $10^3$ $M^{-1}$ at room temperature (e.g. 23° C.). Within this range, the electroactive species (in a reduced state) can have a binding constant with the target gas of $10^1$ to $10^{20}$ $M^{-1}$, $10^3$ to $10^{19}$ $M^{-1}$, $10^4$ to $10^{18}$ $M^{-1}$, $10^5$ to $10^{17}$ $M^{-1}$, $10^6$ to $10^{16}$ $M^{-1}$, or $10^7$ to $10^{15}$ $M^{-1}$. In an aspect, the binding constant with the target gas is $10^5$ to $10^{20}$ $M^{-1}$, or $10^{10}$ to $10^{15}$ $M^{-1}$. In an aspect, the target gas can be carbon dioxide ($CO_2$), and the electroactive species (in a reduced state) can have a binding constant with the $CO_2$ of $10^{1}10^{1}$ to $10^{15}$. In an aspect, the target gas can be sulfur dioxide ($SO_2$), and the electroactive species (in a reduced state) can have a binding constant with the $SO_2$ of $10^{5}$ to $10^{20}$.

The electroactive species can have an oxidized state, wherein upon oxidation, the target gas can be released from the electroactive species. The binding constant of the reduced electroactive species can be greater than the binding constant of the corresponding oxidized electroactive species. Accordingly, in an advantageous feature, capture and release of the target gas can be achieved through redox cycling.

The electroactive species can be capable of binding the target gas on a timescale on the order of minutes, on the order of seconds, on the order of milliseconds, or on the order of microseconds or less.

In an aspect, the electroactive species can have a reduced state in which the electroactive species is capable of bonding with the target gas, but for which there is at least one temperature (e.g., in a range of greater than or equal to 223 K, greater than or equal to 248 K, greater than or equal to 273 K, or greater than or equal to 298 K, and up to 323 K, up to 348 K, or up to 413 K, for example 298 K) at which it is thermodynamically unfavorable for the electroactive species to react with oxygen ($O_2$). In an aspect, the electroactive species can have a reduced state in which the electroactive species is capable of bonding with the target gas, but for which there is at least one temperature (e.g., 298 K) at which it is kinetically unfavorable for the electroactive species to react with oxygen ($O_2$) because a rate, e.g., rate constant, for the reaction with oxygen is too slow for a reaction to occur on a timescale commensurate with capture of the target gas. Accordingly, the electroactive species of the composite effectively provides a suitable specificity towards capture of the target gas.

The electroactive species of the composite can comprise an electroactive polymer, an electroactive oligomer, an electroactive organic compound, or a combination thereof. The electroactive species can include at least one functional group capable of binding to a target gas, for example a carbonyl group.

Exemplary electroactive organic compounds can include, but are not limited to, a substituted or unsubstituted quinone or tetrone. In an aspect, the electroactive species comprises a substituted or unsubstituted quinone (e.g., the quinone can include one or more functional groups or other moieties or linkages bound to the quinone). The choice of substituent (e.g., functional groups) on the substituted quinone can depend on a variety of factors, including but not limited to its effect on the reduction potential of the substituted quinone. One of ordinary skill, with the benefit of this disclosure, would understand how to determine which substituents or combinations of substituents on the substituted quinone are suitable for the first electroactive species based on, for example synthetic feasibility and resulting reduction potential. Exemplary functional groups can include, but are not limited to, halo (e.g., chloro, bromo, iodo), hydroxyl, carboxylate/carboxylic acid, sulfonate/sulfonic acid, alkylsulfonate/alkylsulfonic acid, phosphonate/phosphonic acid, alkylphosphonate/alkylphosphonic acid, acyl (e.g., acetyl or ethyl ester), amino, amido, quaternary ammonium (e.g., tetraalkylamino), branched or unbranched alkyl (e.g., $C_{1-18}$ alkyl), heteroalkyl, alkoxy, glycoxy, polyalkyleneglycoxy (e.g., polyethyleneglycoxy), imino, polyimino, branched or unbranched alkenyl, branched or unbranched alkynyl, aryl, heteroaryl, heterocyclyl, nitro, nitrile, thiyl, or carbonyl groups, any of which can be substituted or unsubstituted. Any organic or inorganic counterion can be present in the foregoing charged species, for example an alkali metal, alkaline earth metal, ammonium, or a substituted ammonium of the formula $R_4N^+$ wherein each R is the same or different, and is independently a $C_{1-18}$ hydrocarbyl, provided that that least one R is hydrocarbyl.

In an aspect, the electroactive species comprises a substituted or unsubstituted quinone of structure (I) or (II):

(I)

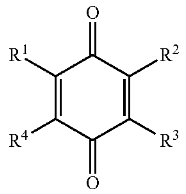

(II)

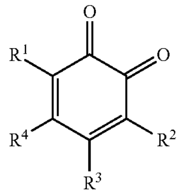

wherein $R^1$, $R^2$, $R^3$, and $R^4$ are independently at each occurrence hydrogen, halogen (e.g., chloro, bromo, iodo), hydroxyl, carboxylate/carboxylic acid, sulfonate/sulfonic acid, alkylsulfonate/alkylsulfonic acid, phosphonate/phosphonic acid, alkylphosphonate/alkylphosphonic acid, acyl (e.g., acetyl or ethyl ester), amino, amido, quaternary ammonium (e.g., tetraalkylamino), branched or unbranched $C_{1-18}$ alkyl, heteroalkyl, alkoxy, glycoxy, polyalkyleneglycoxy (e.g., polyethyleneglycoxy), imino, polyimino, branched or unbranched alkenyl, branched or unbranched alkynyl, aryl, heteroaryl, heterocyclyl, nitro, nitrile, thiyl, or carbonyl groups, any of which can be substituted or unsubstituted, and any two adjacent $R^1$-$R^4$ groups can optionally join together to form a cyclic group.

In an aspect, the electroactive organic compound can comprise a quinone, here defined as a cyclic, conjugated system having an even number of carbonyl groups that can be reduced in the manner shown below to form the corresponding aromatic species.

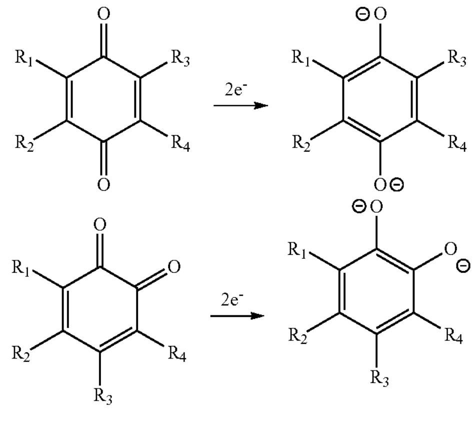

These include derivatives of 1,4-benzoquinone, 1,2-benzoquinone, naphthoquinone, anthraquinone, phenanthrenequinone, benzanthraquinone, dibenzoanthraquinone, 4,5,9,10-pyrenetetrone, or a combination thereof. Any of the foregoing can optionally be substituted as described above. In an aspect, the electroactive organic compound is a substituted or unsubstituted naphthoquinone. Other regioisomers of the foregoing non-limiting exemplary electroactive organic compounds can also be used (e.g., with substituents at different positions of the quinone).

In an aspect, the electroactive species comprises the electroactive polymer. As used herein, the term "polymer" refers to structures having greater than 10 repeating units. For example, an electroactive polymer can comprise repeating units including any of the foregoing electroactive organic compounds. Suitable electroactive polymers can include, for example, those comprising repeating units derived from a substituted or unsubstituted quinone. In an aspect, at least a portion of the electroactive polymer comprises a polymer backbone wherein at least one of the electroactive organic compounds is covalently bound to the polymer backbone. In an aspect, the electroactive organic compounds can form at least a portion of the polymer backbone.

In an aspect, the electroactive polymer comprises repeating units derived from a quinone, which as described above can include 1,4-benzoquinone, 1,2-benzoquinone, naphthoquinone, anthraquinone, phenanthrenequinone, benzanthraquinone, dibenzoanthraquinone, 4,5,9,10-pyrenetetrone, or a combination thereof.

In an aspect, the electroactive polymer can comprise substituted or unsubstituted poly(anthraquinone). In an aspect, the electroactive polymer can comprise a substituted or unsubstituted poly(vinyl anthraquinone). In an aspect, the electroactive polymer can comprise a substituted or unsubstituted poly(phenylnaphthoquinone).

In an aspect, the electroactive species comprises the electroactive oligomer. As used herein, the term "oligomer" refers to structures having 2 to 10 repeating units. The electroactive oligomer can accordingly have any structure as described for the electroactive polymer, except that it is limited to 10 repeat units or less. For example, suitable electroactive oligomers can include those comprising repeating units derived from a substituted or unsubstituted quinone, preferably an oligomer comprising repeating units derived from 1,4-benzoquinone, 1,2-benzoquinone, naphthoquinone, anthraquinone, phenanthrenequinone, benzanthraquinone, dibenzoanthraquinone, 4,5,9,10-pyrenetetrone, or a combination thereof. In an aspect, the electroactive oligomer can comprise oligo(anthraquinone). In an aspect, the electroactive oligomer can comprise an oligo(vinyl anthraquinone). In an aspect, the electroactive oligomer can comprise a substituted or unsubstituted oligo(phenylnaphthoquinone).

When the electroactive species comprises the electroactive polymer or the electroactive oligomer, the electroactive polymer or the electroactive oligomer can optionally be crosslinked. Crosslinking can be effected by various methods generally known in the art. The skilled person, with the benefit of this disclosure, would be able to determine a suitable crosslinking chemistry based on the selection of the electroactive species.

The thickness of the electroactive species on the surface of the carbon nanotubes of the carbon nanotube mat can be, for example, 0.1 to 20 nanometers, or 0.2 to 15 nanometers, or 0.5 to 10 nanometers. The thickness of the electroactive species on the surface of the carbon nanotubes can depend on the mode of deposition.

The electroactive species can be present in an amount of 10 to 90 weight percent, based on the total weight of the composite. Within this range, the electroactive species can be present in an amount of at least 20 weight percent, or at least 25 weight percent, or at least 30 weight percent, or least 40 weight percent, or at least 50 weight percent, based on the total weight of the composite. Also within this range, the electroactive species can be present in an amount of at most 80 weight percent, or at most 70 weight percent, or at most 60 weight percent, or at most 50 weight percent, or at most 45 weight percent, or at most 40 weight percent. For example, the electroactive species can be present in an amount of 10 to 75 weight percent, or 10 to 60 weight percent, or 15 to 60 weight percent, or 20 to 55 weight percent, or 25 to 55 weight percent, or 30 to 50 weight percent, based on the total weight of the composite.

The electroactive species and the carbon nanotube mat can be present in a weight ratio of 1:10 to 10:1, or 1:5 to 5:1, or 1:10 to 1:1.

The electroactive species is reactive toward a target gas. The target gas is an electrophilic molecule. In an aspect, the target gas is a Lewis acid gas. The target gas is capable of forming a complex or an adduct with the electroactive species of the composite when the electroactive species is in a reduced state, for example, by bonding to the electroactive species in its reduced state. The target gas can comprise carbon dioxide ($CO_2$), a sulfur oxide species such as sulfur dioxide ($SO_2$) or sulfur trioxide ($SO_3$), an organosulfate ($R_2SO_4$, where each R is independently hydrogen, $C_{1-12}$ alkyl, or $C_{6-20}$ aryl) such as dimethyl sulfate, a nitrogen oxide species such as nitrogen dioxide ($NO_2$) or nitrogen trioxide ($NO_3$), a phosphate ester ($R_3PO_4$, where each R is independently hydrogen, $C_{1-12}$ alkyl, or $C_{6-20}$ aryl) such as trimethyl phosphate, an ester (RCOOR' where each R is independently hydrogen, $C_{1-12}$ alkyl, or $C_{6-20}$ aryl, and each R' is independently $C_{1-12}$ alkyl or $C_{6-20}$ aryl) such as methyl formate or methyl acrylate, an aldehyde (RCHO, where each R is independently hydrogen, $C_{1-12}$ alkyl, or $C_{6-20}$ aryl) such as formaldehyde or acrolein, a ketone ($R_2CO$, where each R is independently hydrogen, $C_{1-12}$ alkyl, or $C_{6-20}$ aryl) such as acetone, an isocyanate (RNCO, where each R is independently hydrogen, $C_{1-12}$ alkyl, or $C_{6-20}$ aryl, and each R' is independently $C_{1-12}$ alkyl or $C_{6-20}$ aryl) such as methyl isocyanate, isothiocyanate (RNCS, where each R is independently hydrogen, $C_{1-12}$ alkyl, or $C_{6-20}$ aryl, and each R' is independently $C_{1-12}$ alkyl or $C_{6-20}$ aryl), a borane ($BR_3$, where each R is independently hydrogen, $C_{1-12}$ alkyl, or $C_{6-20}$ aryl) such as trimethyl borane, or a borate ($R_3BO_3$, where each R is independently hydrogen, $C_{1-12}$ alkyl, or $C_{6-20}$ aryl) such as trimethyl borate. The target gas can optionally comprise a combination of any of the foregoing target gas species.

As described above, the carbon nanotube mat is a porous, nonwoven carbon nanotube mat. The composite preferably retains at least some degree of porosity following deposition of the electroactive species. For example, the composite can have a porosity of at least 20%, or 20 to 95%, or 20 to 75%, or 30 to 60%.

The composite can advantageously have a thickness of less than 100 micrometers. For example, the composite can have a thickness that is 2 to 100 micrometers, or 2 to 95 micrometers, or 5 to 75 micrometers, or 5 to 50 micrometers, or 10 to 40 micrometers. Without wishing to be bound by theory, it is believed that a thin composite, when used as an electrode material, can enable a higher capture rate of a target gas species relative to a thicker electrode of similar composition, such as an electrode having a thickness of greater than 100 micrometers). The thickness may be in a direction orthogonal to a major surface of the electrode.

In addition to the nonwoven carbon nanotube mat and the electroactive species, the composite can optionally further comprise one or more additional components. For example, the nonwoven carbon nanotube mat can further comprise carbon fibers (e.g., electrospun carbon fibers, activated carbon fibers, vapor grown fibers, and the like or a combination thereof), graphene, reduced graphene oxide, carbon black, Ketjen black, or structured carbon black. The composite can optionally further comprise a polymer binder. Suitable polymer binders include a thermoplastic elastomer, such as styrene-butadiene-styrene (SBS) block copolymer, a styrene-ethylene-butadiene-styrene (SEBS) block copolymer, a styrene-(styrene butadiene)-styrene block copolymer, a styrene butadiene rubber (SBR), a butadiene rubber (BR), a natural rubber (NR), isoprene rubber (IR), ethylene-propylene-diene monomer (EPDM). Examples of the binder additionally include polystyrene, a polyolefin, an olefin-based thermoplastic elastomer, a polycycloolefin, or a silicone. In an aspect, the binder may comprise polyacrylic acid (PAA), polyvinylidene difluoride, polyvinyl alcohol, carboxymethyl cellulose (CMC), starch, hydroxypropyl cellulose, polyvinylpyrrolidone, tetrafluoroethylene, polyethylene, polypropylene, sulfonated EPDM. A combination comprising at least one of the foregoing, e.g., a copolymer, is mentioned. When present, the one or more additional components can be included in the nonwoven mat in an amount of 1 to 20 volume percent, based on the total volume of composite.

Methods for the manufacture of the composite represent another aspect of the present disclosure. In an aspect, the method comprises contacting the nonwoven carbon nanotube mat with the electroactive species, which can be in any suitable form, including a solution, a melt, or a vapor phase. The contacting can comprise, for example, dip coating, drop casting, spin coating, spray coating, or doctor blading, or a combination thereof. In an aspect, the method can comprise repeating the contacting until a desired composite thickness, porosity, or composition is achieved. In an aspect, the contacting can be by contacting a vapor phase comprising the electroactive species with the nonwoven carbon nanotube mat. When the electroactive species comprises an electroactive polymer, oligomer, or combination comprising either of the foregoing, the method can optionally further include crosslinking the electroactive polymer or oligomer on the surface of the carbon nanotube mat.

In an aspect, the method can include contacting the nonwoven nanotube mat with a solution comprising a plurality of electroactive monomers (e.g., an electroactive organic compound as described above and including a polymerizable group, e.g., a vinyl group, a styrenic group, a (meth)acrylate group, or a combination thereof). The solution further comprises at least one initiator capable of initiating polymerization of the electroactive monomers (e.g., a radical initiator), and, optionally, a crosslinker. The method further comprises initiating polymerization or crosslinking of the electroactive monomers in the presence of the nonwoven mat to provide the composite by an in situ polymerization technique.

In an aspect, a solution comprising a plurality of electroactive monomers (e.g., an electroactive organic compound as described above and including a polymerizable group, e.g., a vinyl group, a styrenic group, a (meth)acrylate group, or a combination thereof) can be applied to the carbon nanotube mat, and the monomers can be grafted to a surface of the carbon nanotubes by electrochemical or chemical polymerization. Activated vapor deposition (e.g., initiated chemical vapor deposition, iCVD) can also be used to provide a composite in which electroactive polymer or oligomer is grafted to the carbon nanotube mat.

In an aspect, an electroactive polymer can be disposed on the carbon nanotube mat using a reactive precipitation technique in which two or more electroactive monomers and at least one initiator can be applied to the mat to form an insoluble network.

In an aspect, the composite can be prepared from a dispersion comprising carbon nanotubes and the electroactive species. The carbon nanotubes and the electroactive species can be as described above. For example, the carbon nanotubes, the electroactive species, and optionally any additives (e.g., a surfactant, a binder, and the like or a combination thereof) can be combined in a solvent to provide the dispersion. The dispersion can be formed using various techniques including, but not limited to, ultrasonication, ball milling, and the like or a combination thereof. Suitable solvents can include, for example, tetrahydrofuran, N-methyl pyrrolidone, methyl ethyl ketone, N,N-dimethylformamide, N,N-dimethylacetamide, toluene, 2-butanone, water, methanol, ethanol, 2-propanol, and the like or a combination thereof. In an aspect, the carbon nanotubes can be present in the dispersion in an amount of 0.05 to 10 weight percent, or 0.05 to 7.5 weight percent, based on the total weight of the dispersion. In an aspect, the electroactive species can be present in the dispersion in an amount of 0.05 to 5 weight percent, based on the total weight of the dispersion. The dispersion can be applied onto a substrate to provide the carbon nanotube mat. Applying the dispersion to the substrate can be by, for example, drop casting, dip coating, blade coating, spray coating, uniform coating, slot-die coating, gravure coating, ink-jet printing, 3-D printing, extrusion, co-extrusion of multiple phases, or any combination thereof.

Various methods for the manufacture of the composites described herein are further described in the working examples below.

An electrode assembly comprising the composite represents another aspect of the present disclosure. In an aspect, the electrode assembly comprises the composite and a porous separator. The composite can be disposed on the porous separator, optionally with one or more intervening layers disposed between the composite and the porous separator. In an aspect the composite can be laminated to the porous separator. The porous separator can comprise any suitable material. In an aspect, the porous separator can comprise a polymer film, for example a film comprising a polyamide, a polyolefin, a polyaramid, a polyester, a polyurethane, an acrylic resin, and the like, or a combination thereof. The polymer may be coated on one or both sides with ceramic nanoparticles. In an aspect, the porous separator can comprise cellulose, a synthetic polymeric material, or a polymer/ceramic composite material. Further examples of separators can include polyvinylidene difluoride (PVDF) separators, polytetrafluoroethylene (PTFE), PVDF-alumina composite separators, and the like.

An electrochemical cell comprising the composite represents another aspect of the present disclosure. The electrochemical cell comprises a first electrode comprising the above-described composite, a second electrode comprising a complementary electroactive composite layer, and a first separator between the first electrode and the second electrode.

The separator can be as described above for the electrode assembly. The separator can serve as a protective layer that can prevent the respective electrochemical reactions at each electrode from interfering with each other. The separator can also help electronically isolate the first and second electrodes from one another or from other components within the electrochemical cell to prevent a short-circuit. A person of ordinary skill, with the benefit of this disclosure, would be able to select a suitable separator.

The electrochemical cell can further comprise an electrolyte. The electrolyte can have a suitable conductivity at room temperature (e.g., 23° C.). In an aspect the separator can be partially or completely impregnated with the electrolyte. Impregnating the separator with the electrolyte can be by submerging, coating, dipping, or otherwise contacting the separator with the electrolyte. Some or all of the pores of the porous separator can be partially or completely filled with the electrolyte. In an aspect, the separator can be saturated with the electrolyte.

In an aspect the electrolyte comprises an ionic liquid, for example a room temperature ionic liquid (RTIL). Ionic liquids can have low volatility, for example a vapor pressure of less than $10^{-5}$ Pa, or $10^{-10}$ to $10^{-5}$ Pa at a temperature of 23° C., which can reduce the risk of the separator drying out, and allow for reduction in loss of the electrolyte due to evaporation of entrainment. In an aspect the ionic liquid accounts for substantially all (e.g., at least 80 volume percent, or at least 90 volume percent, or at least 95 volume percent, or at least 98 volume percent, at least 99 volume percent, or at least 99.9 volume percent) of the electrolyte.

The ionic liquid comprises an anion component and a cation component. The anion of the ionic liquid can comprise, but is not limited to halide, sulfate, sulfonate, carbonate, bicarbonate, phosphate, nitrate, nitrate, acetate, $PF_6$, $BF_4$, triflate, nonaflate, bis(trifluoromethylsulfonyl)amide, trifluoroacetate, heptaflurorobutanoate, haloaluminate, triazolide, or an amino acid derivative (e.g., proline with the proton on the nitrogen removed). The cation of the ionic liquid can comprise one or more of, but is not limited to, imidazolium, pyridinium, pyrrolidinium, phosphonium, ammonium, sulfonium, thiazolium, pyrazolium, piperidinium, triazolium, pyrazolium, oxazolium, guanadinium, an alkali cation, or dialkylmorpholinium. In an aspect, the room temperature ionic liquid comprises an imidazolium as a cation component. In an aspect, the room temperature ionic liquid comprises 1-butyl-3-methylimidazolium ("Bmim") as a cation component. In an aspect, the room temperature ionic liquid comprises bis(trifluoromethylsulfonyl)imide ("TFSI") as an anion component. In an aspect, the room temperature ionic liquid comprises 1-butyl-3-methylimidazolium bis(trifluoromethylsulfonyl)imide ("[Bmim][TFSI]"). In an aspect, the room temperature ionic liquid comprises 1-butyl-3-methylimidazolium tetrafluoroborate ("$BF_4$") ("[Bmim][$BF_4$]").

The second electrode of the electrochemical cell comprises a complementary electroactive composite layer. The complementary electroactive composite layer can be the same or different from the composite of the present disclosure. The complementary electroactive composite layer comprises a second electroactive species which can be the same or different as the electroactive species of the composite of the first electrode.

In an aspect, the complementary electroactive composite layer comprises the same electroactive species as the composite of the first electrode. In an aspect, the complementary electroactive composite layer comprises a second electroactive species which is different from the first electroactive species of the composite of the first electrode. In an aspect the second electroactive species of the complementary electroactive composite layer can be an electroactive organic molecule, an electroactive polymer, an electroactive oligomer, an electroactive inorganic complex, an electroactive metallocene, or a combination thereof. The electroactive organic molecule, electroactive polymer, and electroactive oligomer can be as previously described.

In an aspect, the second electroactive species can be an electroactive inorganic complex, for example an alkali metal-transition metal oxide or an alkali metal-transition metal phosphate of the formula $$AM^1X$$

wherein A is Li, Na, or K; $M^1$ is Ni, Co, Mn, Al, Ti, Mo, Fe, V, Si, or a combination thereof; and X is $O_2$ or $PO_4$. In an aspect, the second electroactive species can be $LiFePO_4$.

In an aspect, the second electroactive species of the complementary electroactive composite layer comprises a metallocene. An example of a suitable metallocene can include, but is not limited to ferrocene, or a polymer comprising repeating units derived from ferrocene (e.g., polyvinyl ferrocene), or derivatives thereof.

During operation of the electrochemical cell, the second electroactive species of the complementary electroactive composite layer can serve as a source of electrons for the reduction of the first electroactive active species of the first electrode. Likewise, the second electroactive species of the complementary electroactive composite layer can serve as a sink for electrons during the oxidation of the first electroactive species of the first electrode.

In an aspect, the second electrode can further comprise a substrate, which can be positioned proximate to or between complementary electroactive composite layers. The substrate can be in direct or indirect contact with the complementary electroactive composite layer or layers. When present, the substrate can include, for example, carbon paper (treated, TEFLON-treated, or untreated), carbon cloth, nonwoven carbon mat, or a nonwoven carbon nanotube mat. In an aspect, the support can comprise the same nonwoven carbon nanotube mat of the composite of the first electrode. In an aspect, the substrate of the second electrode can be a conductive material and act as a current collector within the electrochemical cell.

In an aspect, the first electrode can be a negative electrode, and the second electrode can be a positive electrode. The terms negative electrode and positive electrode are used for convenience and clarity, although they may be technically accurate only when the target gas is being acquired or released.

In an aspect, the second electrode can be positioned between first electrodes. Each of the first electrodes can comprise the disclosed composite. In an aspect the first electrodes and/or second electrodes can be identical in configuration or composition.

In an aspect, the electrochemical cell comprises a single separator, disposed between the first electrode and the second electrode, e.g., between the negative electrode and the positive electrode. Electrochemical cells can be combined to make a stack in any suitable combination of parallel and series configurations. In an aspect, the electrochemical cell can comprise more than one separator. For example, one of skill in the art would understand that depending on the selected combination of series and parallel configurations, a single separator may be used, or a plurality of separators may be preferred.

The electrochemical cell can optionally further comprise a gas permeable layer. The gas permeable layer can be positioned adjacent to the first electrode, on a side opposite the separator. The gas permeable layer can comprise a conductive solid material and act as a current collector within the cell. The gas permeable layer can comprise a porous material. In an aspect, the gas permeable layer has a porosity, for example, of greater than or equal to 60%, greater than or equal to 70%, greater than or equal to the 75%, greater than or equal to 80%, or greater. In an aspect, the gas permeable layer has a porosity of less than or equal to 85%, less than or equal to 90%, or more. Combinations of these ranges are possible. For example, in an aspect, the gas permeable layer of the first electrode has a porosity of greater than or equal to 60% and less than or equal to 90%. Other porosities are also possible. Examples of suitable materials for the gas permeable layer include, without limitation, carbon paper (treated, TEFLON-treated, or untreated), carbon cloth, and nonwoven carbon mat.

The electrochemical cell can optionally further comprise a gas flow field. The gas flow field, when present, can be positioned adjacent to the gas permeable layer, on a side opposite the first electrode. When the gas permeable layer is not present in the electrochemical cell, the gas flow field can be positioned adjacent to the first electrode, on a side opposite the separator.

An electrochemical cell according to an aspect of the present disclosure is shown in FIG. 1A. FIG. 1A shows an electrochemical cell 100 including a first electrode 110 which comprises an electroactive species capable of bonding with a target gas when the electroactive species is in a reduced state, a separator 180, a second electrode 170, an optional gas diffusion layer 115, and a gas flow field 160. The first electrode 110 comprises an electrically conductive scaffold 120, electroactive species 130, and electrolyte in, e.g., filling, the space around the scaffold and electroactive species. FIG. 1C shows an electrode composition, for example, as described in U.S. patent application Ser. No. 16/659,398, filed Oct. 21, 2019. In the electrode composition of FIG. 1C, the electrically conductive scaffold 120 comprises a paper of carbon fiber 122, onto which carbon nanotubes 124 coated with electroactive species 130 are deposited. The figure is not to scale; the diameter of commercial carbon fiber is 3 orders of magnitude larger than that of carbon nanotubes. FIG. 1C shows that the carbon fiber occupies a substantial volume. In commercial carbon fiber papers and felts, a volume fraction of carbon fiber of at least 15% is used to achieve structural integrity. FIG. 1B shows an electrode comprising a composite according to the present disclosure, in which the conductive scaffold 120 is a nonwoven carbon nanotube mat comprising a plurality of entangled carbon nanotubes 124. The electroactive species 130 is coated onto the surfaces of the nanotubes. Advantageously, the nonwoven carbon nanotube mat (1) serves a structural role, to maintain pore space into which electrolyte can be filled; (2) provides high surface area on which to deposit the adsorbent; and (3) serves an electrical role, providing a percolating pathway for electrons to travel from the gas diffusion layer 115 to the electroactive species 130.

The electrochemical cell can be particularly useful for the separation of a target gas from a gas mixture when the gas mixture is contacted with the electrochemical cell, and thus is particularly well suited for use in a gas separation system. The gas separation system comprises a plurality of electrochemical cells in fluid communication with a gas inlet and a gas outlet.

The gas mixture, also referred to as the input gas, can be at least partially separated upon exposure to the electrochemical cell. The gas mixture can be, for example, ambient air (e.g., air from an ambient environment, such as outdoor air). In an aspect, the gas separation system can be used for direct air capture. The systems and methods described herein can be useful for removing a target gas such as carbon dioxide directly from ambient air (e.g., to reduce greenhouse gas levels), without the need for any pre-concentration step. Certain aspects of the present disclosure can make the systems and methods described herein particularly useful for direct air capture (e.g., an ability to bond with a target gas while being thermodynamically disfavored from reacting with major components of ambient air, such as oxygen).

In an aspect, the concentration of the target gas in the gas mixture is relatively low, for example when the gas mixture is ambient air. For example, the concentration of the target gas in the gas mixture prior to exposure to the electrochemical cell can be less than or equal to 500 ppm, or less than or equal to 450 ppm, or less than or equal to 400 ppm, or less than or equal to 350 ppm, or less than or equal to 300 ppm, or less than or equal to 200 ppm. In an aspect, the concentration of the target gas in the gas mixture can be as low as 100 ppm, or as low as 50 ppm, or as low as 10 ppm.

In an aspect, the gas mixture (e.g., input gas mixture) is ventilated air. The ventilated air can be air in an enclosed or at least partially enclosed place (e.g., air being circulated in an enclosed place). Examples of places in which the gas mixture (e.g., ventilated air) can be located include, but are not limited to sealed buildings, partially ventilated places, car cabins, inhabited submersibles, air crafts, and the like.

The concentration of target gas in the ventilated air can be higher than ambient air but lower than concentrations typical for industrial processes. In an aspect, the concentration of the target gas in the gas mixture prior to exposure to the electrochemical cell is less than or equal to 5,000 ppm, or less than or equal to 4,000 ppm, or less than or equal to 2,000 ppm, or less than or equal to 1,000 ppm. In an aspect, the concentration of the target gas in the gas mixture (e.g., when it is ventilated air/air in enclosed spaces) is as low as 1,000 ppm, or as low as 800 ppm, or as low as 500 ppm, or as low as 200 ppm, or as low as 100 ppm, or as low as 10 ppm.

In an aspect, the gas mixture comprises oxygen gas ($O_2$). In an aspect, the gas mixture has a relatively high concentration of oxygen gas (e.g., prior to exposure to the electrochemical cell). Certain aspects of the systems and methods described herein (e.g., the choice of particular electroactive species, methods of handling gases in the system, etc.) can contribute to an ability to capture target gases in gas mixtures in which oxygen gas is present without deleterious interference. In an aspect, oxygen gas is present in the gas mixture (e.g., prior to exposure to the electrochemical cell) at a concentration of greater than or equal to 0 volume percent, or greater than or equal to 0.1 volume percent, or greater than or equal to 1 volume percent, or greater than or equal to 2 volume percent, or greater than or equal to 5 volume percent, or greater than or equal to 10 volume percent, or greater than or equal to 20 volume percent, or greater than or equal to 50 volume percent, or greater than or equal to 75 volume percent, or greater than or equal to 90 volume percent, greater than or equal to 95 volume percent. In an aspect, oxygen gas is present in the gas mixture at a concentration of less than or equal to 99 volume percent, or less than or equal to 95 volume percent, or less than or equal to 90 volume percent, or less than or equal to 75 volume percent, or less than or equal to 50 volume percent, or less than or equal to 25 volume percent, or less than or equal to 21 volume percent, or less than or equal to 10 volume percent, or less than or equal to 5 volume percent, or less than or equal to 2 volume percent.

In an aspect, the gas mixture comprises water vapor. The gas mixture can comprise water vapor for example, because it is or comprises ambient air or ventilated air. In an aspect, the gas mixture (e.g., prior to exposure to the electrochemical cell) has a relatively high relative humidity. For example, in an aspect, the gas mixture can have a relative humidity of greater than or equal to 0%, or greater than or equal to 5%, or greater than or equal to 10%, or greater than or equal to 25%, or greater than or equal to 50%, or greater than or equal to 75%, or greater than or equal to 90% at at least one temperature in the range of −50 to 140° C. In an aspect, the gas mixture can have a relative humidity of less than or equal to 100%, or less than or equal to 95%, or less than or equal to 90%, or less than or equal to 75%, or less than or equal to 50%, or less than or equal to 25%, or less than or equal to 10% at at least one temperature in the range of −50 to 140° C.

The target gas can be separated from the gas mixture in the gas separation system by applying a potential difference across the electrochemical cells of the gas separation system. One of ordinary skill, with the benefit of this disclosure, would understand how to apply a potential across the electrochemical cell. For example, the potential can be applied by connecting the negative electrode and the positive electrode to a suitable power source capable of polarizing the negative and positive electrodes. In an aspect the power supply can be a DC voltage. Nonlimiting examples of a suitable power source include batteries, power grids, regenerative power supplies (e.g., wind power generators, photovoltaic cells, tidal energy generators), generators, and the like, and combinations thereof.

The potential difference can be applied to the electrochemical cells during at least a portion of the time that a gas mixture is exposed to the electrochemical cell. In an aspect, the potential difference can be applied prior to exposing the gas mixture to the electrochemical cell.

Application of a positive voltage to the electrochemical cell, during a charging mode, results in a redox reaction at the negative electrode wherein the electroactive species is reduced. As discussed herein, the electroactive species is selected for having a higher affinity for the target gas when it is in a reduced state relative to when it is in an oxidized state. By reducing the electroactive species and passing a gas mixture across the first electrode, the target gas can bond to the electroactive species. In this way the target gas can be removed from the gas mixture to provide a treated gas mixture (e.g., comprising a lesser amount of the target gas relative to the initial gas mixture).

The potential difference applied across the electrochemical cell, during the charge mode, can have a particular voltage. The potential difference applied across the electrochemical cell can depend, for example, on the reduction potential for the generation of at least one reduced state of the first electroactive species, as well as the standard potential for the interconversion between a reduced state and an oxidized state of the electroactive species in the second electrode. The voltage further includes the current multiplied by the stack electrochemical resistance. In an aspect, the potential difference is at least 0 V, or at least 0.1 V, or at least 0.2 V, or at least 0.5 V, or at least 0.8 V, or at least 1.0 V, or at least 1.5 V. In an aspect, the potential difference is less than or equal to 2.0 V, or less than or equal to 1.5 V, or less than or equal to 0.5 V, or less than or equal to 0.2 V.

In an aspect, when the electroactive species of the first electrode comprises a quinone, the electroactive species can be reduced to at least one of its reduced states:

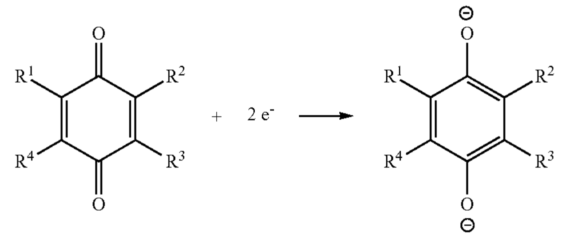

In an aspect, when the electroactive species of the first electrode comprises a quinone and the electroactive species is reduced in the presence of a target gas, for example carbon dioxide, the reduced form of the electroactive species can bond with the carbon dioxide:

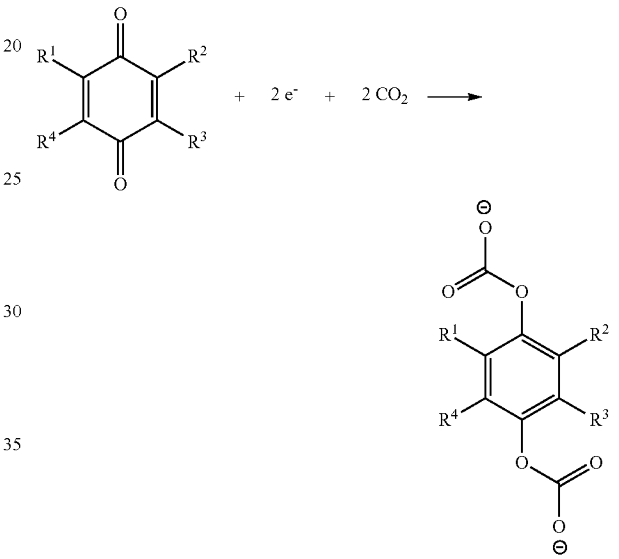

In an aspect, while the electroactive species is reduced at the first electrode, a second electroactive species (e.g., a redox active polymer such as polyvinyl ferrocene) is being oxidized at the second electrode. During the charge mode, the oxidation of the second electroactive species provides a source of electrons for driving the reduction of the first electroactive species.

While the exemplary reaction shown above are shown taking place in one direction, it will be understood that some reversibility can be exhibited. Analogous reaction can take place with different electroactive species, as would be understood by a person of ordinary skill in the art.

In an aspect, a relatively large amount of the target gas is removed from the gas mixture during the processes described herein. Removing a relatively large amount of the target gas can, in some cases, be beneficial for any of a variety of applications, such as capturing gases that can be deleterious if released into the atmosphere for environmental reasons. For example, the target gas can comprise carbon dioxide, and removing a relatively high amount of the carbon dioxide from gas mixture can be beneficial to either limit the greenhouse gas impact of a process (e.g., an industrial process or transportation process) or to even reduce the amount of carbon dioxide in a room or the atmosphere (either for thermodynamic reasons for heating and air conditioning processes or for environmental reasons).

In an aspect the amount of target gas in a treated gas mixture (e.g., a gas mixture from which an amount of the target gas is removed upon being exposed to the electrochemical cell) is less than or equal to 50%, less than or equal to 25%, less than or equal to 10%, less than or equal to 5%, less than or equal to 2%, less than or equal to 1%, less than or equal to 0.5%, less than or equal to 0.1% of the amount (in volume percent) of the target gas in the original gas mixture prior to treatment (e.g., the amount of the target in the gas mixture prior to being exposed to electrochemical cell). In an aspect, the amount of target gas in a treated gas mixture is greater than or equal to 0.001%, greater than 0.005%, greater than or equal to 0.01%, greater than or equal to 0.05%, greater than or equal to 0.1%, greater than or equal to 0.5%, greater than or equal to 1%, greater than or equal to 2%, greater than or equal to 5% of the amount (in volume percent) of the target gas in the original gas mixture prior to treatment.

In an aspect, a second potential difference can be applied across the electrochemical cell after at least a portion of the target gas is bonded to the electroactive species. The second potential difference can be different than that first potential difference. In an aspect, applying the second potential difference results in a step of releasing a portion or all of the target gas bonded with the electroactive species to produce a second treated gas mixture. The second treated gas mixture can have a higher amount of the target gas than the input gas mixture. For example, target gas may be present in the second treated gas mixture in an amount such that its volume percent is 10% higher, 20%, higher 50%, 100% higher, 200% higher, 1000% higher, and/or up to 2,000% higher, 5,000% higher, 10,000% higher, or more than the first amount of gas mixture.

The gas separation system can comprise an external circuit connecting the negative electrode and the positive electrode of each electrochemical cell to a power source configured to apply a potential difference across the negatives electrode and the positive electrode of each electrochemical cell. Each of the electrochemical cells of the gas separation system can be as described above. The electrochemical cells of the gas separation system can be stacked according to various configurations that are generally known in the art, including parallel or in series.

In an aspect, a gas separation system comprises a first set of electrochemical cells and a second set of electrochemical cells. Each of the first set and the second set can comprise one or more electrochemical cells as described throughout this disclosure. The first and second set can be made to run in parallel in an alternating fashion, such that one set of cells is operating in a charge mode and capturing a target gas (e.g., $CO_2$) from a gas mixture while another set of cells is operating in a discharge mode and releasing the target gas (e.g., $CO_2$). The system can comprise separate housings for each of the sets of electrochemical cells. The system can further comprise conduits and valving arranged to direct flow in a desired manner. The gas separation system can allow for nearly continuous separation of a gas mixture (e.g., gas stream), with the gas mixture being directed to the set of cells operating in a charge/capture mode, at a given moment, while a separate target gas-rich treated mixture is produced by the other set of cells operating in a discharge/release mode. Furthermore, additional sets of electrochemical cells may be added in parallel or in series, according to the needs of the application.

The gas mixture (e.g., a gas stream such as an input gas stream) can be introduced to the gas separation system at a particular flow rate. In an aspect, the flow rate can be greater than or equal to 0.001 L/s, greater than or equal to 0.005 L/s greater than or equal to 0.01, greater than or equal to 0.05 L/s, greater than or equal to 0.1 L/s, greater than or equal to 0.5 L/s, greater than or equal to 1 L/s, greater than or equal to 5 L/s, greater than or equal to 10 L/s, greater than or equal to 10 50 L/s, or greater than or equal to 100 L/s. In an aspect, the flow rate of the gas mixture (e.g., a gas stream such as an input gas stream) can be less than or equal to 500 L/s, less than or equal to 400 L/s, less than or equal to 300 L/s, less than or equal to 200 L/s, less than or equal to 100 L/s, less than or equal to 50 L/s, less than or equal to 10 L/s, less than or equal to 1 L/s, less than or equal to 0.5 L/s, or less than or equal to 0.1 15 L/s.

In an aspect, during or after the step of releasing the target gas, the method further comprises applying a vacuum condition to the electrochemical cell to remove at least a portion or all of the released target gas from the electrochemical cell. One of ordinary skill, with the benefit of this disclosure, would understand suitable techniques and equipment for applying a vacuum condition to the electrochemical cell. For example, a vacuum pump can be fluidically connected to a gas outlet of the electrochemical cell. The vacuum pump can be operated to produce a negative pressure differential between the electrochemical cell bed and a downstream location. This vacuum condition can provide a force sufficient to cause target gas released during the releasing step described above to flow out of the electrochemical cell. The vacuum condition can be applied such that the pressure inside the electrochemical cell during or after the releasing of the target gas is less than or equal to 760 torr, less than or equal to 700 torr, less than or equal to 500 torr, less than or equal to 100 torr, less than or equal to 50 torr, less than or equal to 10 torr, and/or as low as 5 torr, as low as 1 torr, as low as 0.5 torr, as low as 0.1 torr.

In an aspect, the composite of the first electrode has a particular capacity for absorbing target gas (e.g., $CO_2$). For example, the composite can have an absorption capacity of at least 0.01 mol per $m^2$, at least 0.02 mol per $m^2$, at least 0.05 mol per $m^2$, or more. In an aspect, the composite can have an absorption capacity of less than or equal to 0.2 mol per $m^2$, less than or equal to 0.08 mol per $m^2$, less than or equal to 0.05 mol per $m^2$, less than or equal to 0.03 mol per $m^2$, or less. For example, the composite can have an absorption capacity of at least 0.01 mol per $m^2$ and less than or equal to 0.2 mol per $m^2$, or at least 0.02 mol per $m^2$ and less than or equal to 0.08 mol per $m^2$.

In an aspect the composite of the first electrode can have a particular surface area that is exposed to the gas mixture, for example, of greater than or equal to 5 $cm^2$, greater than or equal to 8 $cm^2$, greater than or equal to 10 $cm^2$, or up to 10 $cm^2$, up to 20 $cm^2$ or more.

Various components of a system, such as the electrodes (e.g., negative electrode, positive electrodes), power source, electrolyte, separator, container, circuitry, insulating material, and the like can be fabricated by those of ordinary skill in the art from any of a variety of components. Components can be molded, machined, extruded, pressed, isopressed, printed, infiltrated, coated, in green or fired states, or formed by any other suitable technique.

The electrodes described herein (e.g., negative electrode, positive electrodes) can be of any suitable size or shape. Non-limiting examples of shapes include sheets, cubes, cylinders, hollow tubes, spheres, and the like. The electrodes may be of any suitable size, depending on the application for which they are used (e.g., separating gases from ventilated air, direct air capture, etc.). Additionally, the electrode can comprise a means to connect the electrode to another electrode, a power source, and/or another electrical device. Those of ordinary skill in the art are readily aware of techniques for forming components of system herein.

Various electrical components of system may be in electrical communication with at least one other electrical component by a means for connecting. A means for connecting can be any material that allows the flow of electricity to occur between a first component and a second component. A non-limiting example of a means for connecting two electrical components is a wire comprising a conductive material (e.g., copper, silver, etc.). In an aspect, the system can comprise electrical connectors between two or more components (e.g., a wire and an electrode). In an aspect, a wire, electrical connector, or other means for connecting can be selected such that the resistance of the material is low. In as aspect, the resistances can be substantially less than the resistance of the electrodes, electrolyte, or other components of the system.

Electrochemical cells and gas separation systems of the present disclosure can further be as described in U.S. patent application Ser. No. 16/659,398, the contents of which is incorporated by reference in its entirety for all purposes.

The electrochemical cells, systems, and methods described herein can be implemented in a variety of applications. The number of electrochemical cells or sets of cells can be scaled to the requirements of a particular application as needed. The following aspects provide several non-limiting examples of applications. In an aspect, the systems and methods described herein can be for removing a target gas (e.g., $CO_2$) from ambient air, as well as enclosed spaces such as airtight building, car cabins—reducing the heating cost of incoming air for ventilation—and submarines and space capsules, where an increase in $CO_2$ levels could be catastrophic. In aspects directed to the electrical power industry, they can be used for capturing carbon dioxide post-combustion at varying concentrations. In an aspect, the systems and methods are suitable for separate target gases from industrial flue gas or industrial process gas. Also, they can be used for capturing sulfur dioxide and other gases from flue gas. In aspects directed to the oil and gas industry, the disclosed systems and methods can be used for capturing carbon dioxide and other gases from various processes and diverting them for downstream compression or processing. The disclosed systems and methods can be applied to capture carbon dioxide from burning natural gas used to heat the greenhouses in mild and cold climates, then diverting the captured dioxide into the greenhouse for the plants to use in photosynthesis, i.e., to feed the plants.

This disclosure is further illustrated by the following examples, which are non-limiting.

EXAMPLES

Example 1

Poly(phenylnapthoquinone) (PPNQ) was dissolved in tetrahydrofuran, N-methyl-2-pyrrolidone, or xylene at a concentration of 1 milligram per millimeter (for xylene) or 10 milligrams per milliliter (for THF or NMP). A carbon nanotube (CNT) mat, obtained as Miralon™, commercially available from Nanocomp Technologies, Inc., was submerged in the solutions of PPNQ in sealed vials and allowed to sit at room temperature for 1 to 72 hours. The mat samples were then removed from the vials, rinsed using the same solvent that was used for the soaking process, and then dried under reduced pressure at a temperature of 60-80° C. for at least 12 hours. The weight of the CNT mat pieces after submersion in the polymer solution was compared to the initial weight of the bare CNT mat. For each solution, the amount of PPNQ was about 0.1 mg/cm$^2$, for example 0.1 to 0.5 milligrams of polymer per square inch of CNT mat. The PPNQ-coated mats were imaged using scanning electron microscopy (SEM) on a Jeol JSM 7401F scanning electron microscope at 10 kV acceleration voltage. FIG. 9 shows a SEM micrograph of the coated mat at 10K magnification, and FIG. 10 shows a SEM micrograph of the coated mat at 25K magnification.

The PPNQ-CNT mat composite electrodes were then cut into 1.98 cm$^2$ disks and assembled into cells with poly(vinyl ferrocene) counter electrode, Celgard 3401 separator, and Bmim-TFSI electrolyte filling the pores of the electrodes and separator. Performance was characterized using cyclic voltammetry (CV), chronoamperometry, and repeated charge-discharge cycling in both sealed cell with $CO_2$ atmosphere and flow cell geometries under $N_2$+$O_2$+$CO_2$ atmospheres.

Figure 3:
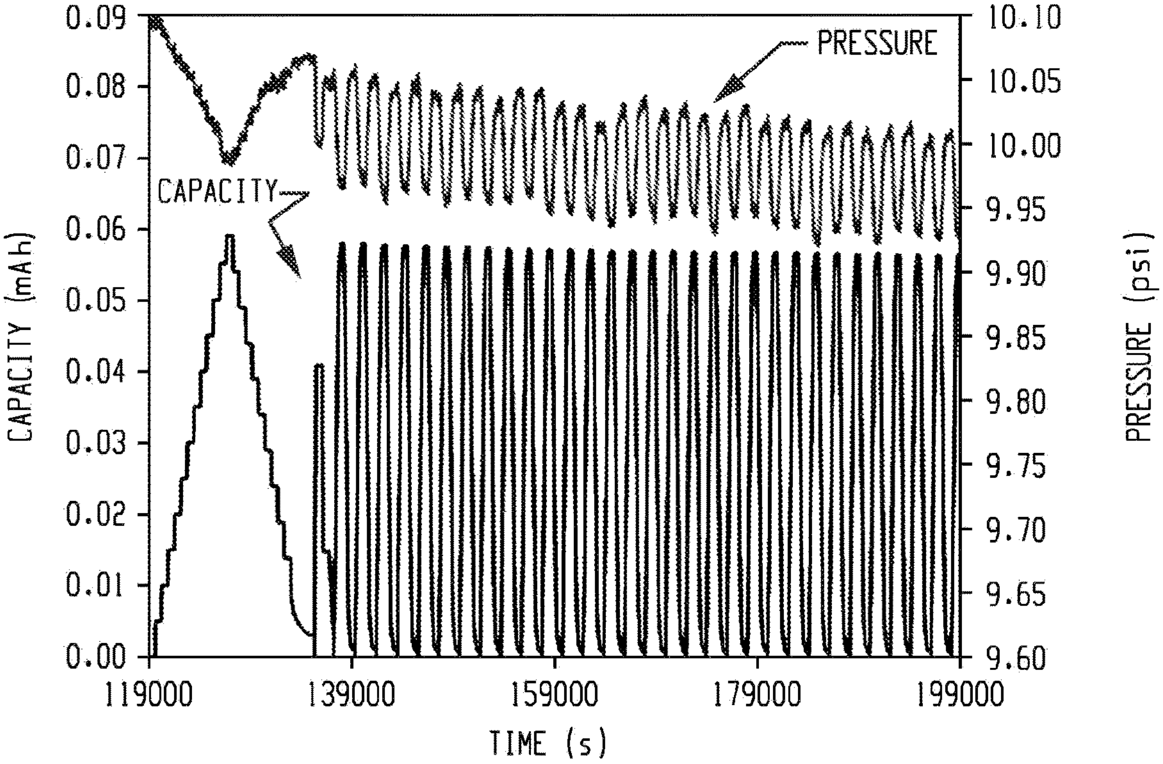
FIG. 3 is a graph of charge-discharge capacity (milliampere-hours) and gas pressure (psi) versus time and shows capturing and releasing $CO_2$ from the electrochemical cell according to Example 1.

FIG. 2 shows the voltage and current versus time during charge-discharge of the sealed cell. FIG. 3 shows the pressure change in the headspace, which tracks the capacity (Ah) passed into the electrode. Pressure decreases as $CO_2$ is adsorbed during charging of the cell, and pressure increases as $CO_2$ is released back into the headspace of the sealed cell under reduced pressure. The cyclic voltammetry data provides electrochemical characterization of the electrode, confirming the expected reduction potentials of the embedded redox moieties and demonstrating effective polymer loading via current density, and demonstrates $CO_2$ reactivity of the composite. Cyclic voltammetry of the PPNQ composite electrode shows characteristic electrochemical behavior for a polymeric quinone species and demonstrates reactivity towards $CO_2$.

Example 2

Figure 5:
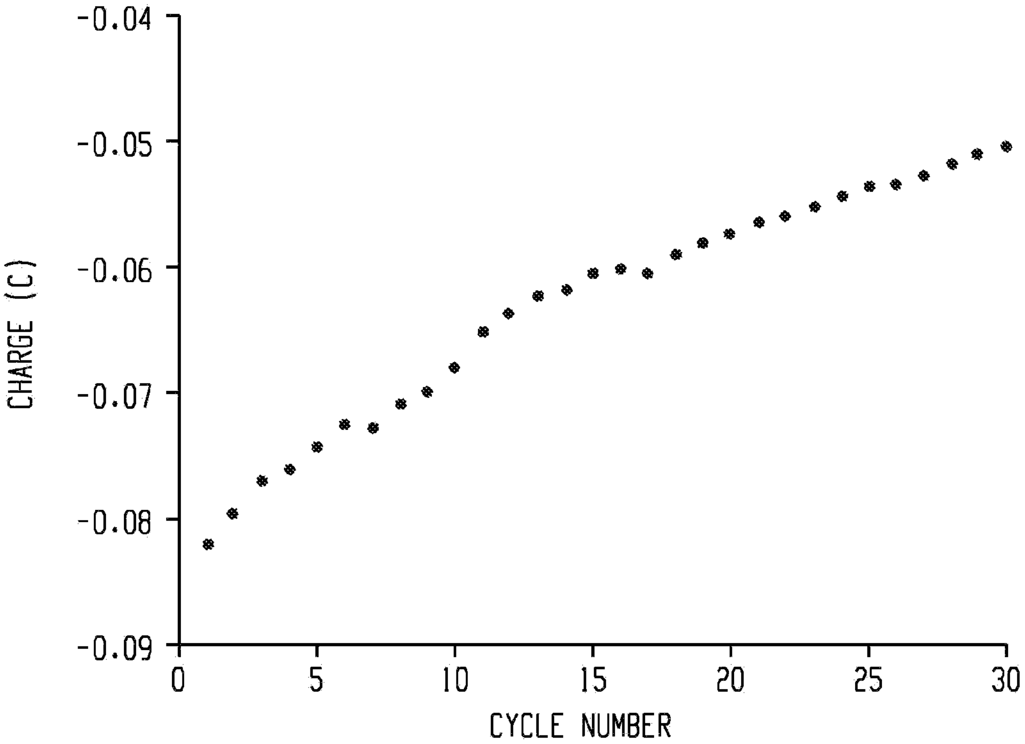
FIG. 5 is a graph of charge passed (coulombs) as a function of cycle number for the 30 voltage-sweepcycles used to fabricate the electrode of Example 2.
Figure 6:
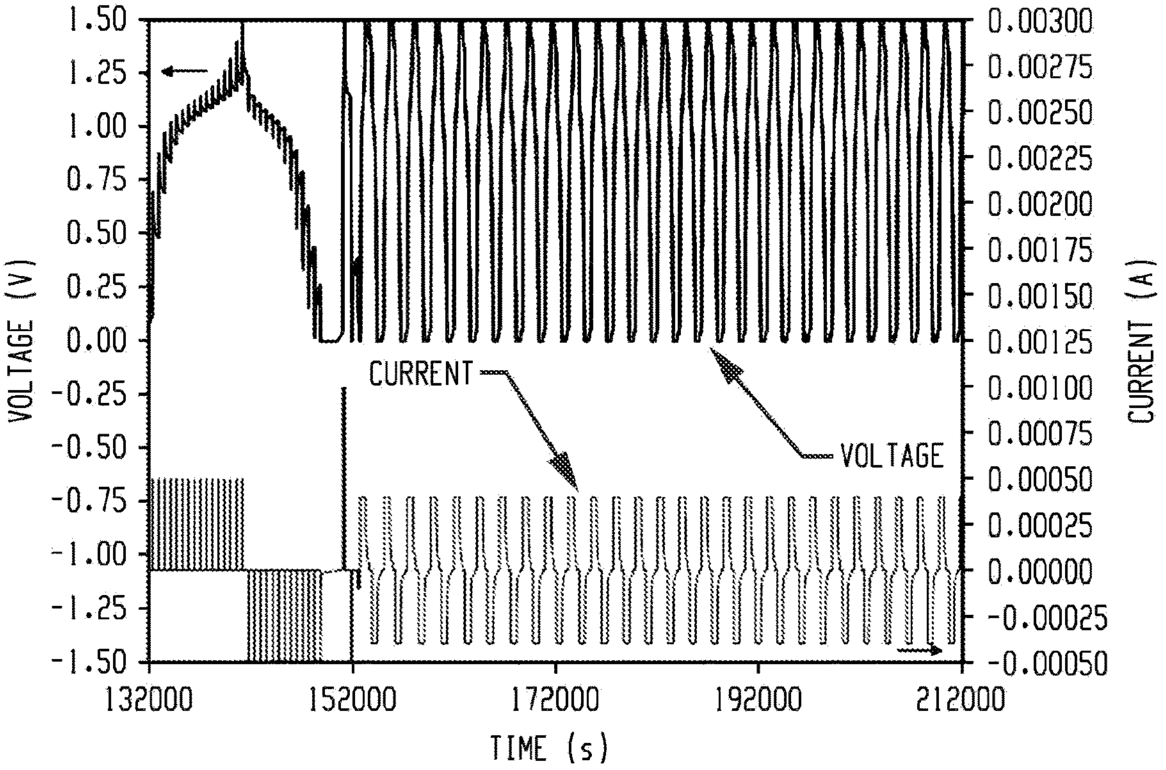
FIG. 6 is a graph of cell voltage (volts) and current (amperes) versus time (seconds) for an electrochemical cell according to Example 2.

A solution of anthraquinone-1-diazonium tetrafluoroborate (5 mM) and tetrabutylammonium hexafluorophosphate (100 mM) was prepared in acetonitrile. A 1×2 cm CNT mat was soaked in the solution for one hour, and then cycled between 1.1 V and −0.2 V vs. Ag/Ag$^+$ for 30 cycles at a scan rate of 50 mV/s. The cycling was done in a three-electrode electrochemical cell containing a platinum wire counter electrode and a jacketed silver wire reference electrode fitted with a CoralPor frit. Charge declined across the 30 cycles of the grafting procedure, consistent with consumption of reactive sites on the CNT mat. The resulting electrodes were characterized by cyclic voltammetry (CV), chronoamperometry, and repeated charge-discharge cycling in a sealed cell under $CO_2$ atmosphere. Results are shown in FIG. 4-6.

Figure 4:
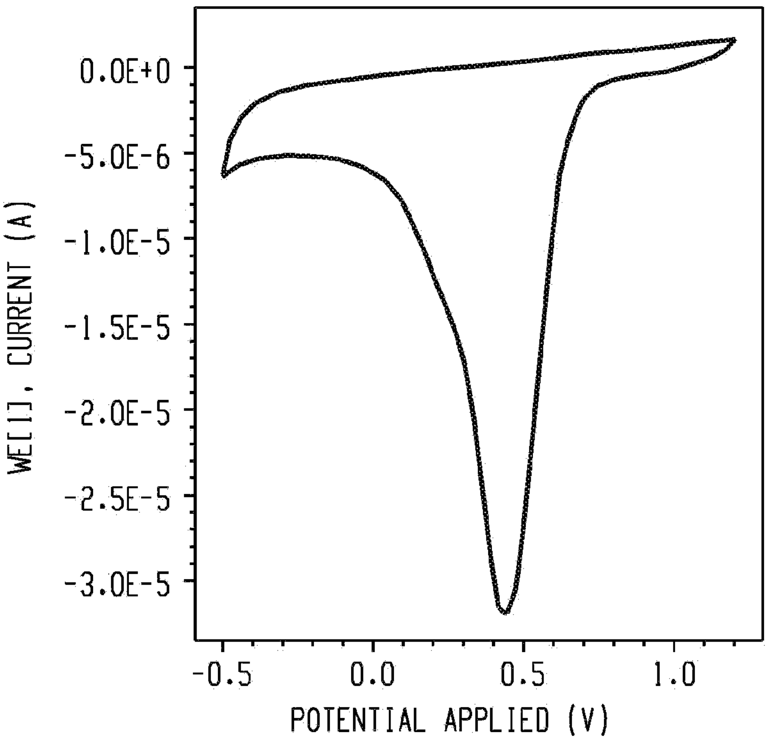
FIG. 4 is a graph of current (amperes) versus applied potential (volts) during the electrochemical grafting to fabricate the electrode described in Example 2.
Figure 7:
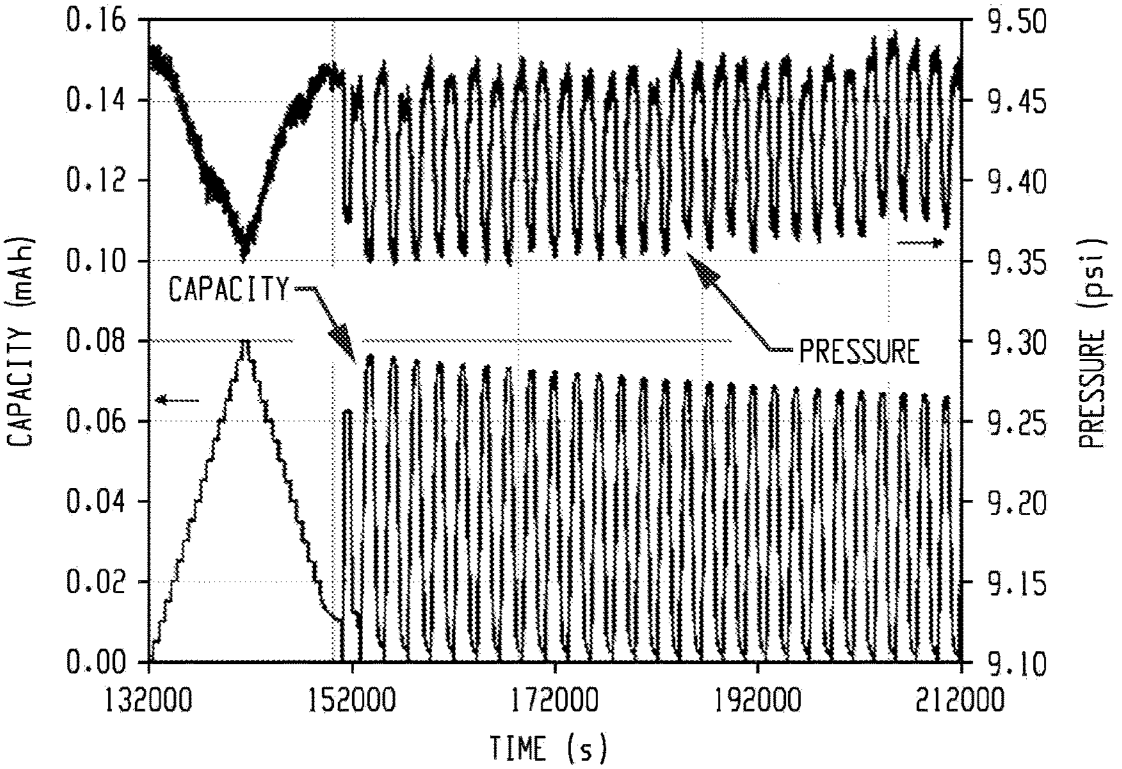
FIG. 7 is a graph of charge-discharge capacity (milliampere-hours) and gas pressure (psi) versus time and shows the capture and release of CO2 from the electrochemical cell according to Example 2.

FIG. 4 shows a single cycle from a cyclic voltametric grafting procedure of anthraquinone-1-diazonium (50 mV/s, tetrabutylammonium hexafluorophosphate supporting electrolyte, 1.2 to −0.5 V vs Ag/Ag*). The peak in the cyclic voltammogram corresponds to the irreversible reduction of the quinone diazonium species, which proceeds with the loss of $N_2$ and subsequent C—C bond formation. FIG. 5 shows a plot of the charge passed as a function of cycle number across the 30-cycle grafting experiment. The nanotube mat with grafted anthraquinone was then cut into a 1.98 cm$^2$ disk and assembled into a cell with poly(vinyl ferrocene) counter electrode, Celgard 3401 separator, and Bmim-TFSI electrolyte in a sealed cell with $CO_2$ atmosphere with 6 mL headspace volume. FIG. 6 shows the voltage and current versus time during charging and discharging. FIG. 7 shows the amount of charge passed and its resultant pressure change in the headspace, which decreases as $CO_2$ is adsorbed during charge and increases as $CO_2$ is released during discharge.

Example 3

Poly(phenylnaphthoquinone) (PPNQ) was dissolved in N-methyl-2-pyrrolidone at a concentration of 6 milligrams per millimeter. The solution was sprayed onto a carbon nanotube (CNT) mat, obtained as Miralon™, commercially available from Nanocomp Technologies, Inc, using a home-built spray coater with a rastering spray head to a loading of 1 milligram PPNQ per square centimeter of CNT mat. The freshly sprayed mat was transferred on a Teflon support to a thermal dehydrator (LEM Mighty Bite 10 Tray Dehydrator) and dried for 2 hours at 65° C.

The resulting PPNQ-CNT mat composite electrodes were then cut into either 1.98 $cm^2$ disks or 25 $cm^2$ squares and assembled into cells with a poly(vinyl ferrocene) counter electrode, Celgard 3401 separator, and Bmim-TFSI electrolyte filling the pores of the electrodes and separator. Performance was characterized using cyclic voltammetry (CV), chronoamperometry, and repeated charge-discharge cycling in both sealed cell with $CO_2$ atmosphere and flow cell geometries under $N_2$+$O_2$+$CO_2$ atmospheres.

FIG. 8 shows a plot of the flux (g $m^{-2}$ $h^{-1}$) of $CO_2$ in the sprayed PPNQ-CNT mat composite electrode of Example 3, measured in a sealed cell geometry under three concentrations of $CO_2$ in $N_2$. The composite electrode was rapidly charged to 1.7 V (vs. the poly(vinyl ferrocene) counter electrode). The pressure change resulting from $CO_2$ capture by the electrode was recorded over time and fit to a polynomial. The maximum slope of this curve represents the maximum flux of $CO_2$ through the electrode. These results illustrate the mass transport advantages afforded by the porous CNT mat generated in Example 3.

This disclosure further encompasses the following aspects.

Aspect 1: A composite comprising: a nonwoven carbon nanotube mat comprising a plurality of entangled carbon nanotubes; and an electroactive species disposed on the nonwoven carbon nanotube mat, wherein the electroactive species is capable of bonding with a target gas when the electroactive species is in a reduced state and releasing the target gas when the electroactive species is in an oxidized state.

Aspect 2: The composite of aspect 1, wherein the carbon nanotubes have an average diameter of 50 nanometers or less, preferably 1 to 20 nanometers.

Aspect 3: The composite of any of aspects 1 or 2, wherein the carbon nanotubes have an average length of 1 micrometer to 2 millimeters.

Aspect 4: The composite of any of aspects 1 to 3, wherein the composite has a porosity of at least 20%, preferably 30 to 60%.

Aspect 5: The composite of any of aspects 1 to 4, wherein the carbon nanotubes comprise single wall carbon nanotubes, multiwall carbon nanotubes, or a combination thereof.

Aspect 6: The composite of any of aspects 1 to 5, wherein the composite has a thickness of less than 100 micrometers, or 2 to less than 100 micrometers, or 5 to 40 micrometers.

Aspect 7: The composite of any of aspects 1 to 6, wherein the nonwoven carbon nanotube mat further comprises carbon fibers, graphene, reduced graphene oxide, carbon black, Ketjen black, or structured carbon black.

Aspect 8: The composite of any of aspects 1 to 7, wherein the composite further comprises a polymer binder.

Aspect 9: The composite of any of aspects 1 to 8, wherein the electroactive species is on a surface of the nonwoven carbon nanotube mat.

Aspect 10: The composite of any of aspects 1 to 9, wherein electroactive species is on a surface of a carbon nanotube of the nonwoven carbon nanotube mat.

Aspect 11: The composite of any of aspects 1 to 10, wherein the electroactive species comprises an electroactive polymer, an electroactive oligomer, an electroactive organic compound, an electroactive inorganic complex, an electroactive organometallic complex, or a combination thereof.

Aspect 12: The composite of any of aspects 1 to 11, wherein the electroactive species comprises an electroactive polymer, an electroactive oligomer, an electroactive organic compound, or a combination thereof.

Aspect 13: The composite of any of aspects 1 to 12, wherein the electroactive species comprises a substituted or unsubstituted quinone or tetrone, preferably benzoquinone, 1,4-naphthoquinone, 1,2-naphthoquinone, anthraquinone, phenanthrenequinone, benzanthraquinone, dibenzoanthraquinone, 4,5,9,10-pyrenetetrone, or a combination thereof; a polymer or oligomer comprising repeating units derived from a substituted or unsubstituted quinone or tetrone, preferably a polymer comprising repeating units derived from benzoquinone, 1,4-naphthoquinone, 1,2-naphthoquinone, anthraquinone, phenanthrenequinone, benzanthraquinone, dibenzoanthraquinone, 4,5,9,10-pyrenetetrone, or a combination thereof.

Aspect 14: The composite of any of aspects 1 to 13, wherein a content of the electroactive species is 10 to 90 weight percent, based on total weight of the composite.

Aspect 15: The composite of any of aspects 1 to 14, wherein a thickness of the electroactive species on the surface of the carbon nanotubes of the carbon nanotube mat is 0.1 to 20 nanometers.

Aspect 16: The composite of any of aspects 1 to 15, wherein the electroactive species has a binding constant with the target gas of at least $10^1$ $M^{-1}$, preferably $10^1$ to $10^{20}$ $M^{-1}$, more preferably $10^3$ to $10^{20}$.

Aspect 17: The composite of any of aspects 1 to 16, wherein the electroactive species comprises the electroactive polymer or the electroactive oligomer, and the electroactive polymer or the electroactive oligomer are crosslinked.

Aspect 18: The composite of any of aspects 1 to 17, wherein the electroactive species is covalently attached to the nonwoven carbon nanotube mat.

Aspect 19: The composite of any of aspects 1 to 18, wherein the target gas comprises a Lewis acid gas.

Aspect 20: An electrode assembly comprising: a porous separator; and the composite of any of aspects 1 to 19.

Aspect 21: An electrochemical cell comprising the composite of any of aspects 1 to 19

Aspect 22: The electrochemical cell of aspect 21, comprising a first electrode comprising the composite of any of aspects 1 to 19; a second electrode comprising a complementary electroactive composite layer; and a first separator between the first electrode and the second electrode.

Aspect 23: The electrochemical cell of any of aspects 21 to 22, wherein the composite further comprises an electrolyte.

Aspect 24: A gas separation system comprising: a plurality of electrochemical cells in fluid communication with a gas inlet and a gas outlet, wherein each of the plurality of electrochemical cells is according to any of aspects 21 to 23.

Aspect 25: A method of making the composite of any of aspects 1 to 19, the method comprising contacting the nonwoven carbon nanotube mat with the electroactive species.

Aspect 26: The method of aspect 25, wherein contacting the nonwoven carbon nanotube mat with the electroactive species comprises contacting a solution comprising the electroactive species with the nonwoven carbon nanotube mat or contacting a vapor phase comprising the electroactive species with the nonwoven carbon nanotube mat.

Aspect 27: The method of aspect 26, wherein the electroactive species comprises an electroactive polymer, an electroactive oligomer, or a combination thereof and the method further comprises crosslinking the electroactive polymer or the electroactive oligomer.

Aspect 28: A method of making the composite of any of aspects 1 to 19, the method comprising contacting a solution comprising a plurality of electroactive monomers, at least one initiator, and optionally, a crosslinker with the nonwoven carbon nanotube mat; and initiating polymerization in the presence of the nonwoven carbon nanotube mat.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objectives of the compositions, methods, and articles.

All ranges disclosed herein are inclusive of the endpoints, and the endpoints are independently combinable with each other. "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity, and are to be construed to cover both the singular and the plural, unless otherwise indicated herein or clearly contradicted by context. "Or" means "and/or" unless clearly stated otherwise. Reference throughout the specification to "an aspect" means that a particular element described in connection with the aspect is included in at least one aspect described herein, and may or may not be present in other aspects. The term "combination thereof" as used herein includes one or more of the listed elements, and is open, allowing the presence of one or more like elements not named. In addition, it is to be understood that the described elements may be combined in any suitable manner in the various aspects.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. The term "alkyl" means a branched or straight chain, saturated aliphatic hydrocarbon group, e.g., methyl, ethyl, n-propyl, i-propyl, n-butyl, s-butyl, t-butyl, n-pentyl, s-pentyl, and n- and s-hexyl. "Alkenyl" means a straight or branched chain, monovalent hydrocarbon group having at least one carbon-carbon double bond (e.g., ethenyl ($—HC{=}CH_2$)). "Alkoxy" means an alkyl group that is linked via an oxygen (i.e., alkyl-O—), for example methoxy, ethoxy, and sec-butyloxy groups. "Alkylene" means a straight or branched chain, saturated, divalent aliphatic hydrocarbon group (e.g., methylene ($—CH_2—$) or, propylene ($—(CH_2)_3—$)). "Cycloalkylene" means a divalent cyclic alkylene group, $—C_nH_{2n-x}$, wherein x is the number of hydrogens replaced by cyclization(s). "Cycloalkenyl" means a monovalent group having one or more rings and one or more carbon-carbon double bonds in the ring, wherein all ring members are carbon (e.g., cyclopentyl and cyclohexyl). "Aryl" means an aromatic hydrocarbon group containing the specified number of carbon atoms, such as phenyl, tropone, indanyl, or naphthyl. "Arylene" means a divalent aryl group. "Alkylarylene" means an arylene group substituted with an alkyl group. "Arylalkylene" means an alkylene group substituted with an aryl group (e.g., benzyl). The prefix "halo" means a group or compound including one more of a fluoro, chloro, bromo, or iodo substituent. A combination of different halo atoms (e.g., bromo and fluoro), or only chloro atoms can be present. The prefix "hetero" means that the compound or group includes at least one ring member that is a heteroatom (e.g., 1, 2, or 3 heteroatom(s)), wherein the heteroatom(s) is each independently N, O, S, Si, or P. "Substituted" means that the compound or group is substituted with at least one (e.g., 1, 2, 3, or 4) substituents that can each independently be a $C_{1-9}$ alkoxy, a $C_{1-9}$ haloalkoxy, a nitro ($—NO_2$), a cyano (—CN), a $C_{1-6}$ alkyl sulfonyl ($—S({=}O)_2$-alkyl), a $C_{6-12}$ aryl sulfonyl ($—S({=}O)_2$-aryl), a thiol (—SH), a thiocyano (—SCN), a tosyl ($CH_3C_6H_4SO_2—$), a $C_{3-12}$ cycloalkyl, a $C_{2-12}$ alkenyl, a $C_{5-12}$ cycloalkenyl, a $C_{6-12}$ aryl, a $C_{7-13}$ arylalkylene, a $C_{4-12}$ heterocycloalkyl, and a $C_{3-12}$ heteroaryl instead of hydrogen, provided that the substituted atom's normal valence is not exceeded. The number of carbon atoms indicated in a group is exclusive of any substituents. For example $—CH_2CH_2CN$ is a $C_2$ alkyl group substituted with a nitrile.

While particular aspects have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A composite consisting of:
   a nonwoven carbon nanotube mat consisting of
   a plurality of entangled carbon nanotubes, each carbon nanotube of the plurality of entangled carbon nanotubes having an average diameter of 50 nanometers or less, and an average length of 50 micrometers to 2 millimeters;
   optionally, graphene, reduced graphene oxide, carbon black, Ketjen black, or structured carbon black;
   optionally, a polymer binder; and
   an electroactive species disposed on the nonwoven carbon nanotube mat, wherein the electroactive species is capable of bonding with a target gas when the electroactive species is in a reduced state and releasing the target gas when the electroactive species is in an oxidized state.

2. The composite of claim 1, wherein the composite has a porosity of at least 20%.

3. The composite of claim 1, wherein the carbon nanotubes comprise single wall carbon nanotubes, multiwall carbon nanotubes, or a combination thereof.

4. The composite of claim 1, wherein the composite has a thickness of less than 100 micrometers.

5. The composite of claim 1, wherein the electroactive species is on a surface of the nonwoven carbon nanotube mat.

6. The composite of claim 1, wherein electroactive species is on a surface of a carbon nanotube of the nonwoven carbon nanotube mat.

7. The composite of claim 1, wherein the electroactive species comprises an electroactive polymer, an electroactive oligomer, an electroactive organic compound, an electroactive inorganic complex, an electroactive organometallic complex, or a combination thereof.

8. The composite of claim 1, wherein the electroactive species comprises an electroactive polymer, an electroactive oligomer, an electroactive organic compound, or a combination thereof.

9. The composite of claim 1, wherein the electroactive species comprises
   a substituted or unsubstituted quinone or tetrone; or
   a polymer or oligomer comprising repeating units derived from a substituted or unsubstituted quinone or tetrone.

10. The composite of claim 1, wherein a content of the electroactive species is 10 to 90 weight percent, based on total weight of the composite.

11. The composite of claim 1, wherein a thickness of the electroactive species on the surface of the carbon nanotubes of the carbon nanotube mat is 0.1 to 20 nanometers.

12. The composite of claim 1, wherein the electroactive species has a binding constant with the target gas of at least $10^1$ $M^1$.

13. The composite of claim 1, wherein the electroactive species comprises the electroactive polymer or the electroactive oligomer, and the electroactive polymer or the electroactive oligomer are crosslinked.

14. The composite of claim 1, wherein the electroactive species is covalently attached to the nonwoven carbon nanotube mat.

15. The composite of claim 1, wherein the target gas comprises a Lewis acid gas.

16. An electrode assembly comprising:
   a porous separator; and
   the composite of claim 1.

17. An electrochemical cell comprising the composite of claim 1.

18. The electrochemical cell of claim 17, comprising
   a first electrode comprising the composite of claim 1;
   a second electrode comprising a complementary electroactive composite layer; and
   a first separator between the first electrode and the second electrode.

19. The electrochemical cell of claim 17, wherein the composite further comprises an electrolyte.

20. A gas separation system comprising:
   a plurality of electrochemical cells in fluid communication with a gas inlet and a gas outlet, wherein each of the plurality of electrochemical cells is according to claim 17.

21. A method of making the composite of claim 1, the method comprising contacting the nonwoven carbon nanotube mat with the electroactive species.

22. The method of claim 21, wherein contacting the nonwoven carbon nanotube mat with the electroactive species comprises contacting a solution consisting of the electroactive species with the nonwoven carbon nanotube mat or contacting a vapor phase consisting of the electroactive species with the nonwoven carbon nanotube mat.

23. The method of claim 22, wherein the electroactive species comprises an electroactive polymer, an electroactive oligomer, or a combination thereof and the method further comprises crosslinking the electroactive polymer or the electroactive oligomer.

24. A method of making the composite of claim 1, the method comprising
   contacting a solution consisting of a plurality of electroactive monomers, at least one initiator, and optionally, a crosslinker with the nonwoven carbon nanotube mat; and
   initiating polymerization in the presence of the nonwoven carbon nanotube mat.

* * * * *